(12) United States Patent
Akiyama et al.

(10) Patent No.: US 9,739,687 B2
(45) Date of Patent: Aug. 22, 2017

(54) DYNAMOMETER SYSTEM

(71) Applicant: MEIDENSHA CORPORATION, Tokyo (JP)

(72) Inventors: Takao Akiyama, Tokyo (JP); Yoshimasa Sawada, Tokyo (JP); Nobuhiko Asakura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 15/027,932

(22) PCT Filed: Oct. 6, 2014

(86) PCT No.: PCT/JP2014/076691
§ 371 (c)(1),
(2) Date: Apr. 7, 2016

(87) PCT Pub. No.: WO2015/053220
PCT Pub. Date: Apr. 16, 2015

(65) Prior Publication Data
US 2016/0252428 A1 Sep. 1, 2016

(30) Foreign Application Priority Data
Oct. 7, 2013 (JP) .................................. 2013-210518

(51) Int. Cl.
*G01M 15/05* (2006.01)
*G01M 15/02* (2006.01)
*G01L 3/16* (2006.01)

(52) U.S. Cl.
CPC ............... *G01M 15/05* (2013.01); *G01L 3/16* (2013.01); *G01M 15/02* (2013.01)

(58) Field of Classification Search
CPC ..... G01M 15/02; G01M 15/044; G01M 15/04; G01M 15/05; G01L 3/16
(Continued)

(56) References Cited

U.S. PATENT DOCUMENTS 8,006,548 B2 * 8/2011 Akiyama ............... G01M 15/02
73/116.05
9,116,062 B2 * 8/2015 Akiyama ............ G01M 13/025
(Continued)

FOREIGN PATENT DOCUMENTS

| JP | 2003-121308 A | 4/2003 |
| JP | 2003-149085 A | 5/2003 |

(Continued)

*Primary Examiner* — Freddie Kirkland, III
(74) *Attorney, Agent, or Firm* — Muncy, Geissler, Olds & Lowe, P.C.

(57) ABSTRACT

Provided is a dynamometer system dynamo control device that can accurately reproduce a no-load state. The dynamo control device includes controllers that are designed, using a H-infinity control or a μ-design method, such that, for a generalized plant that outputs observation output and a controlled variable from external input and from control input, the response from the input until the variable is shortened. The generalized plant includes a dynamic characteristics model wherein the characteristics of a dynamometer system are identified such that the angular acceleration is output from the external input and the control input. The controlled variable is the difference between the angular acceleration calculated for an engine alone on the basis of the external input and the angular acceleration calculated by the dynamic characteristics model.

8 Claims, 18 Drawing Sheets

(58) Field of Classification Search
USPC .................................................... 73/116.05
See application file for complete search history.

(56) References Cited

U.S. PATENT DOCUMENTS

| | | | | |
|---|---|---|---|---|
| 9,164,005 B2* | 10/2015 | Takahashi | .................. | H02P 6/06 |
| 9,207,149 B2* | 12/2015 | Kanke | .................. | G01M 13/025 |
| 9,234,820 B2* | 1/2016 | Akiyama | ............. | G01M 13/025 |
| 9,255,856 B2* | 2/2016 | Takahashi | .................. | G01L 5/24 |
| 9,400,231 B2* | 7/2016 | Akiyama | .............. | G01M 15/04 |
| 9,459,181 B2* | 10/2016 | Akiyama | ............ | G01M 13/025 |
| 2003/0083793 A1* | 5/2003 | Akiyama | ............ | G01M 15/044 |
| | | | | 701/114 |
| 2003/0088345 A1* | 5/2003 | Akiyama | ............ | G01M 15/044 |
| | | | | 701/32.8 |
| 2010/0251811 A1* | 10/2010 | Akiyama | .............. | G01M 15/02 |
| | | | | 73/116.05 |
| 2014/0019081 A1* | 1/2014 | Suzuki | ....................... | G01L 3/02 |
| | | | | 702/113 |
| 2015/0039246 A1* | 2/2015 | Takahashi | ................. | G01L 5/24 |
| | | | | 702/41 |
| 2015/0101421 A1* | 4/2015 | Takahashi | ................. | H02P 6/06 |
| | | | | 73/862.325 |

FOREIGN PATENT DOCUMENTS

| | | |
|---|---|---|
| JP | 2008-286614 A | 11/2008 |
| JP | 2009-133714 A | 6/2009 |
| JP | 2012-68200 A | 4/2012 |
| JP | 2012-194117 A | 10/2012 |
| JP | 2014224722 A | 12/2014 |

* cited by examiner

DYNAMOMETER SYSTEM

TECHNICAL FIELD

The present invention relates to a dynamometer system. More specifically, the invention relates to a dynamometer system that measures various characteristics of an engine by connecting a dynamometer as a power absorber to a test piece including an engine.

BACKGROUND ART

FIG. 26 is a diagram illustrating the configuration of a dynamometer system 100. The dynamometer system 100 includes a test piece W which includes an engine E and an output shaft S thereof, a dynamometer D which serves as a power absorber connected to the output shaft S of the test piece W, an engine controller 120 which controls the engine E through a throttle actuator 110, a dynamo controller 140 which controls the dynamometer D through an inverter 130, an encoder 150 which detects the rotation speed of the output shaft of the dynamometer D, and a shaft torque sensor 160 which detects the shaft torque (the torsional torque) of a connection portion between the output shaft S of the test piece W and the output shaft of the dynamometer D. It should be noted that FIG. 26 is illustrated by simplifying the mechanical elements such as the clutch, transmission and propeller shaft as the output shaft S, collectively.

The engine controller 120 controls the output of the engine E according to a prescribed pattern for each test item and the dynamo controller 140 controls the rotation speed or the torque of the dynamometer D based on the output of the encoder 150 or the shaft torque sensor 160 (for example, see Patent Documents 1 and 2).

Patent Document 1: Japanese Unexamined Patent Application, Publication No. 2009-133714
Patent Document 2: Japanese Unexamined Patent Application, Publication No. 2003-149085
Patent Document 3: Japanese Unexamined Patent Application, Publication No. 2012-194117

DISCLOSURE OF THE INVENTION

Problems to be Solved by the Invention

Incidentally, in the dynamometer system 100, when the engine speed during the starting of the engine is controlled at a value corresponding to the engine speed during the starting of the engine unit, there is a need to control the dynamometer D in the no-load state in which the engine is not connected to the output shaft S and the dynamometer D. Such a no-load state is realized when the torsional torque of the output shaft S between the engine E and the dynamometer D is controlled at 0 [Nm].

FIG. 27 is a diagram illustrating the change in rotation speed when an engine is started in a case where the no-load state is realized in the conventional system 100. More specifically, FIG. 27 is a diagram illustrating the change in rotation speed when an engine is started in a case where a shaft torque command value input to the dynamo controller 140 is set to 0 so that no torsional torque occurs in the conventional system 100. In FIG. 27, the measurement result of the system 100, that is, the rotation speed measured by the encoder 150 is indicated by a thin solid line. Further, in FIG. 27, a rotation speed measured in the no-load state of the engine E while the engine E and the output shaft S are separated, that is, an ideal value during the no-load control is indicated by a bold dotted line.

As illustrated in FIG. 27, in the configuration in which the shaft torque command value of the conventional system 100 is set to 0 [Nm] and the detection value of the shaft torque sensor is controlled at 0 [Nm], the inertia of a portion of the output shaft S near the engine E in relation to the shaft torque sensor 160 needs to be shared by the engine E. For this reason, the engine speed during the starting of the engine becomes lower than the ideal value corresponding to the no-load state.

Furthermore, in theory, the inertia of the output shaft S can be also shared by the dynamometer D when the position of the shaft torque sensor 160 moves closer to the crank shaft of the engine E. However, when the shaft torque sensor 160 moves close to the engine E, the heat of the engine E is easily transmitted to the shaft torque sensor. For this reason, the influence on changes in measured value caused by the temperature drift increases. Further, when the shaft torque sensor 160 moves close to the engine E, the vibration of the engine E is easily transmitted to the shaft torque sensor. For this reason, measurement precision is degraded. Due to the above-described reason, it is desirable that the position of the shaft torque sensor 160 be close to the dynamometer D in relation to the engine E. Accordingly, the above-described problem becomes severe.

Meanwhile, Patent Document 3 discloses a technique of realizing a no-load state by feed-forward control when an engine is started. In the invention of Patent Document 3, a torque current command value realizing an engine starting dynamo rotation speed measured in advance is output at an engine start time (that is, a first engine ignition signal). With this configuration, the no-load state can be accurately realized. However, in order to realize this configuration, there is a need to measure the rotation speed (corresponding to the bold dotted line of FIG. 27) during the starting of the engine unit, to record the torque current command value when the dynamo rotation speed is controlled so as to realize the rotation speed during the starting of the engine, or to output the recorded torque current command value at an appropriate timing. Thus, this operation takes some time.

An object of the invention is to provide a dynamo control device for a dynamometer system that can accurately realize a no-load state when a test piece is started.

Means for Solving the Problems (1) A dynamometer system (for example, a dynamometer system 1 to be described below) includes: a dynamometer (for example, a dynamometer D to be described later) connected to a test piece (for example, an engine E to be described later) generating power through an intermediate connection body (for example, a shaft S to be described later), a torque detector (for example, a shaft torque sensor 61 to be described later) detecting the torsional torque of the intermediate connection body, a rotation speed detector (for example, an encoder 62 to be described later) detecting the rotation speed of the dynamometer, and an inverter (for example, an inverter 3 to be described later) supplying electric power to the dynamometer. In order to attain the above-described object, the invention provides a dynamo control device (for example, dynamo control devices 6a, 6b, 6c, 6d, 6e, 6f, and 6g to be described later) for the dynamometer system generating a torque current command to the inverter based on the detection signals of the torque detector and the rotation speed detector, wherein the dynamo control device includes a controller (for example, controllers Gc1 and Gc2 to be described later) designed by applying a control system design method called an H ∞ control or a μ synthesis to a generalized plant (for example, generalized plants Pa, Pb, Pc, Pd, Pe, Pf, and Pg to be described later) outputting a prescribed observation output (for example, observation outputs y1 and y2 to be described later) and a prescribed controlled variable (for example, a controlled variable z to be described later) from an external input (for example, an external input w to be described later) corresponding to torque generated in the test piece and a control input (for example, a control input u to be described later) corresponding to a torque current command so that responsiveness from the external input to the controlled variable decreases. The generalized plant includes a dynamic characteristic model (for example, a dynamic characteristic model 7 to be described later) identifying the characteristic of the dynamometer system so that the angular acceleration of the test piece is output from the external input and the control input. The controlled variable of the generalized plant is a signal obtained by multiplying a weighting function having integration characteristics by a difference between the angular acceleration of the test piece unit calculated based on the external input and the angular acceleration of the test piece calculated by the dynamic characteristic model.

(2) In this case, it is desirable for the dynamic characteristic model of the generalized plant to include an inverter model (for example, an inverter model P12 to be described later) identifying the characteristic of the inverter, a mechanical model (for example, mechanical models P4 to P9 to be described later) identifying the characteristic of a three-inertia system configured by connecting the test piece, the intermediate connection body, and the dynamometer, a torque detection model (for example, a torque detection model P10 to be described later) identifying the characteristic of the torque detector, and a rotation speed detection model (for example, a rotation speed detection model P11 to be described later) identifying the characteristic of the rotation speed detector.

(3) In this case, it is desirable that an output obtained by multiplying the control input by a prescribed proportional gain be set as an input to the inverter model, an output of an integrator provided in an output terminal of the torque detection model be set as a first observation output, and an output of a proportional gain provided in an output terminal of the rotation speed detection model be set as a second observation output.

(4) In this case, it is desirable that the control input be set as an input to the inverter model, an output obtained by multiplying a prescribed proportional gain by a difference between an output of the rotation speed detection model multiplied by a prescribed proportional gain and an output of an integrator provided in the output terminal of the torque detection model be set as a first observation output, and an output of the torque detection model be set as a second observation output.

(5) In this case, it is desirable that an output obtained by combining the control input with an output obtained by multiplying a prescribed proportional gain by a difference between an output of the rotation speed detection model multiplied by a prescribed proportional gain and an output of an integrator provided in an output terminal of the torque detection model be set as an input to the inverter model and an output of the torque detection model be set as an observation output.

(6) In this case, it is desirable that the control input be set as an input to the inverter model and an output obtained by multiplying a prescribed proportional gain by a difference between an output of the rotation speed detection model multiplied by a prescribed proportional gain and an output of an integrator provided in an output terminal of the torque detection model be set as an observation output.

(7) In this case, it is desirable that the control input be set as an input to the inverter model, an output obtained by multiplying a prescribed proportional gain by a difference between an output of the rotation speed detection model multiplied by a prescribed proportional gain and an output of an integrator provided in an output terminal of the torque detection model be set as a first observation output, and an output of a high-pass filter provided in the output terminal of the torque detection model be set as a second observation output.

(8) In this case, it is desirable that an output obtained by multiplying a prescribed proportional gain by the control input be set as an input to the inverter model, an output of the torque detection model be set as a first observation output, and a difference between an output of the rotation speed detection model multiplied by a prescribed proportional gain and an output of the torque detection model be set as a second observation output.

Effects of the Invention (1) In the invention, the dynamometer system has a configuration in which the test piece, the intermediate connection body, and the dynamometer are mechanically connected and the inverter, the torque detector, and the rotation speed detector are provided, and the dynamo control device is constructed in accordance with a design method called an H ∞ control or a μ synthesis. More specifically, the generalized plant including the dynamic characteristic model identifying the characteristic of the dynamometer system is defined, the controller is designed so that the responsiveness from the external input corresponding to the torque generated in the test piece to the prescribed controlled variable decreases, and the controller is used for the dynamo control device. Particularly, in the invention, the controlled variable of the generalized plant is set as a difference between the angular acceleration of the test piece unit (that is, the angular acceleration of the test piece on the assumption that the test piece is separated from the intermediate connection body and the dynamometer) calculated based on the external input and the angular acceleration of the test piece calculated by the dynamic characteristic model. Since the controlled variable is set in this way, it is possible to construct the dynamo control device generating the torque current command so that the inertia of the intermediate connection body is compensated by the dynamometer in the system configured by connecting the test piece and the dynamometer respectively generating power through the intermediate connection body. In other words, it is possible to construct the dynamo control device capable of realizing the no-load state in which the test piece is not connected to the intermediate connection body although the test piece and the dynamometer are connected by the intermediate connection body.

Incidentally, the intermediate connection body includes various mechanical components such as a shaft, a clutch, and a transmission and the stiffness is different depending on the type of the vehicle. However, the mechanical resonance point of the system increases as the stiffness of the intermediate connection body increases. Further, since the influence on the delay of the responsiveness of the torque detector, the rotation speed detector, and the inverter increases as the mechanical resonance point increases, it is more difficult to suppress resonance. On the contrary, in the invention, it is possible to construct the dynamo control device having a high resonance suppression effect in addition to the inertia compensation effect of the intermediate connection body in accordance with an H ∞ control or a µ synthesis.

(2) According to the invention, the dynamic characteristic model corresponding to a nominal plant includes the mechanical model identifying the characteristic of the three-inertia system, the inverter model, the torque detection model, and the rotation speed detection model and substantially realizes an actual system. Thus, it is possible to construct the dynamo control device having a high inertia compensation effect and a high resonance suppression effect.

(3) In the invention, in a case where the generalized plant is constructed, the prescribed proportional gain is provided between the control input and the inverter model, the integrator is provided between the torque detection model and the first observation output, and the proportional gain is provided between the rotation speed detection model and the second observation output. The integrator and the proportional gain are control elements essential for the inertia compensation control of the intermediate connection body. Since the essential control elements are included in the generalized plant in advance, the essential control element can be separated from two controllers numerically derived in accordance with an H ∞ control or a µ synthesis and hence the derived controller is easily evaluated. Further, the inertia compensation amount or the control responsiveness can be adjusted without changing the characteristics of the two derived controllers. In other words, there is no need to repeat an H ∞ control or a µ synthesis in order to construct the dynamo control device having a desired characteristic.

(4) In the invention, in a case where the generalized plant is constructed, the integrator and two proportional gains are provided between the rotation speed detection model and the second observation output. Accordingly, since the control element essential for the inertia compensation control can be separated from the derived controller similarly to the invention (3), the controller is easily evaluated and the inertia compensation amount or the control responsiveness can be adjusted without changing the characteristics of the controller.

(5) In the invention, in a case where the generalized plant is constructed, the integrator and two proportional gains are provided among the control input, the torque detection model, the rotation speed detection model, and the inverter model. Accordingly, since the control element essential for the inertia compensation control can be separated from the derived controller similarly to the invention (3), the controller is easily evaluated and the inertia compensation amount or the control responsiveness can be adjusted without changing the characteristics of the controller. Further, since one observation output is used in the generalized plant, one controller can be derived. As described above, since the inertia compensation control is mainly required when the test piece is started and one controller is used to perform the inertia compensation control, the bumpless process is easily performed when the control state is switched from the inertia compensation control to the other process.

(6) In the invention, in a case where the generalized plant is constructed, the integrator and two proportional gains are provided among the torque detection model, the rotation speed detection model, and the observation output. Accordingly, since the control element essential for the inertia compensation control can be separated from the derived controller similarly to the invention (3), the controller is easily evaluated and the inertia compensation amount or the control responsiveness can be adjusted without changing the characteristics of the controller. Further, since one observation output is used in the generalized plant, the bumpless process is easily performed similarly to the invention (5).

(7) In the invention, in a case where the generalized plant is constructed, the integrator and two proportional gains are provided among the rotation speed detection model, the torque detection model, and the second observation output and the high-pass filter is provided between the torque detection model and the first observation output. Accordingly, since the control element essential for the inertia compensation control can be separated from the derived controller similarly to the invention (4), the controller is easily evaluated and the inertia compensation amount or the control responsiveness can be adjusted without changing the characteristics of the controller.

(8) In the invention, in a case where the generalized plant is constructed, the proportional gain is provided between the control input and the inverter model and the integrator and the proportional gain are provided among the torque detection model, the rotation speed detection model, and the second observation output. Accordingly, since the control element essential for the inertia compensation control can be separated from the derived controller similarly to the invention (3), the controller is easily evaluated and the inertia compensation amount or the control responsiveness can be adjusted without changing the characteristics of the controller.

PREFERRED MODE FOR CARRYING OUT THE INVENTION

Figure 1:
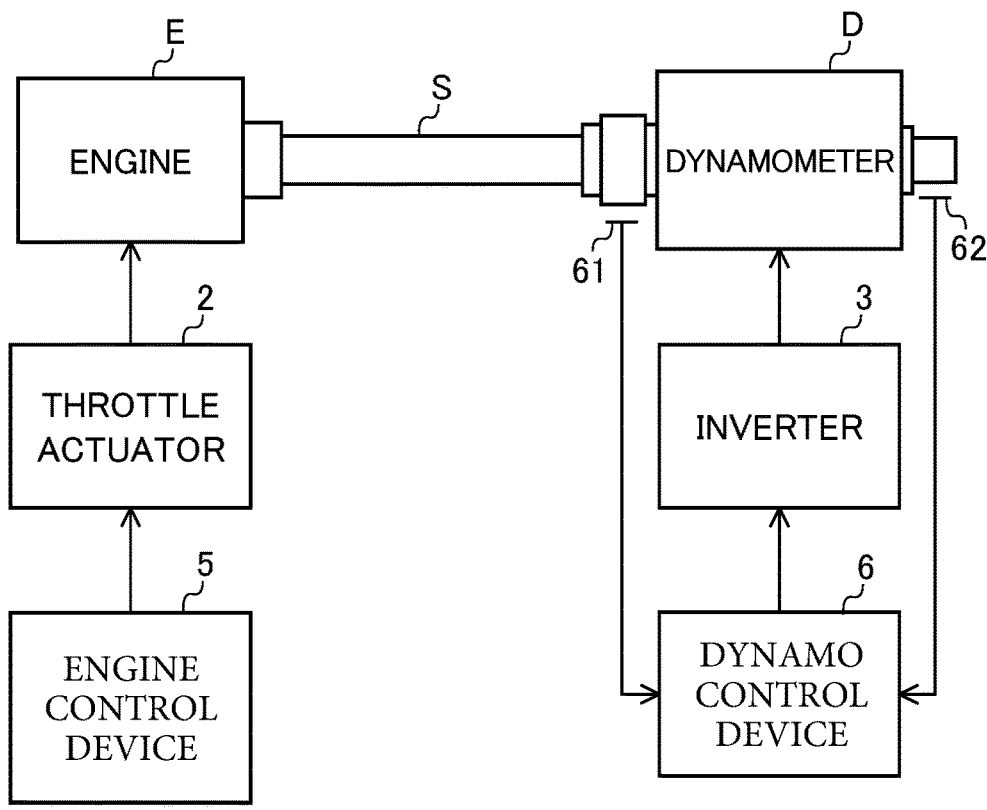
FIG. 1 is a diagram illustrating the configuration of a dynamometer system that uses a dynamo control device according to an embodiment of the present invention.

Hereinafter, an embodiment of the present invention will be explained in detail while referencing the drawings. FIG. 1 is a diagram illustrating the configuration of a dynamometer system 1 that uses a dynamo control device 6 according to the present embodiment. The dynamometer system 1 includes an engine E which serves as a test piece, a dynamometer D which is connected to the engine E through a substantially bar-shaped shaft S, an engine control device 5 which controls the engine E through a throttle actuator 2, an inverter 3 which supplies electric power to the dynamometer D, a dynamo control device 6 which controls the dynamometer D through the inverter 3, a shaft torque sensor 61 which detects the torsional torque of the shaft S, and an encoder 62 which detects the rotation speed of an output shaft SD of the dynamometer D.

The shaft torque sensor 61 detects torsional torque acting on a portion which is close to the dynamometer D in relation to the engine E in the shaft S extending from the engine E to the dynamometer D from, for example, a strain amount in the twisting direction of the shaft S and transmits a signal substantially proportional to the detection value to the dynamo control device 6.

The engine control device 5 starts the engine E at a prescribed timing and controls the output of the engine E in a prescribed manner.

Figure 2:
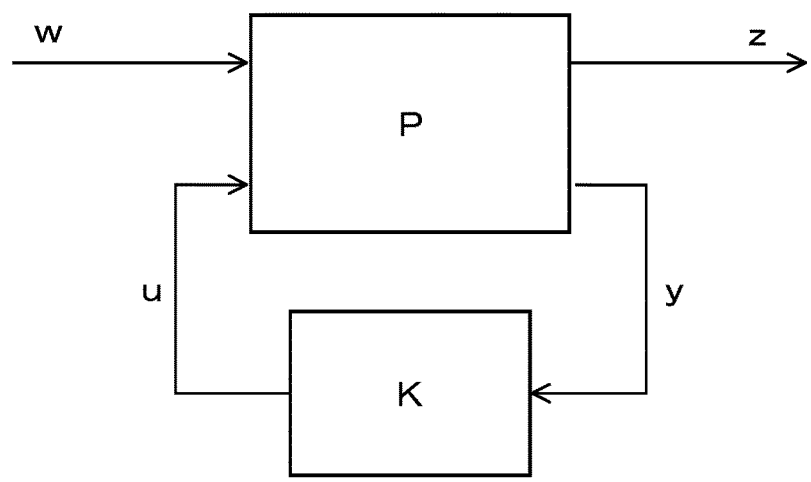
FIG. 2 is a diagram illustrating a control system design method based on an H ∞ control and a µ synthesis using a generalized plant.

The dynamo control device 6 generates a torque current command corresponding to a torque value to be generated in the dynamometer D based on the detection signals of the shaft torque sensor 61 and the encoder 62 so that the power generated by the engine E is absorbed in a prescribed manner and inputs the torque current command to the inverter 3. The dynamo control device 6 is configured by mounting a controller K on a computer, in which the controller K is designed by applying a robust control system design method called an H ∞ control or a μ synthesis to control target defined by a generalized plant P that outputs a prescribed controlled variable z and a prescribed observation output y from a prescribed external input w and a prescribed control input u illustrated in FIG. 2 so that responsiveness from the external input w to the controlled variable z decreases.

The generalized plant P is used in the robust control system design method and includes a weighting function for identifying a control specification and a dynamic characteristic model of a control target. Since a detailed procedure of numerically deriving the controller K attaining a desired control from the generalized plant P according to the H ∞ control or the μ synthesis is described in detail in, for example, "Linear Robust Control", written by Kang-Zhi LIU, published by CORONA PUBLISHING CO., LTD., 2002 or "Control System Design Based on MATLAB", edited by Kenzo NONAMI, written by Hidekazu NISHIMURA and Mitsuo HIRATA, published by Tokyo Denki University Press, 1998, the detailed description thereof will be omitted herein. Hereinafter, the detailed configuration of the generalized plant P and the dynamo control device 6 derived therefrom will be described in Examples 1 to 7.

EXAMPLE 1

Figure 3:
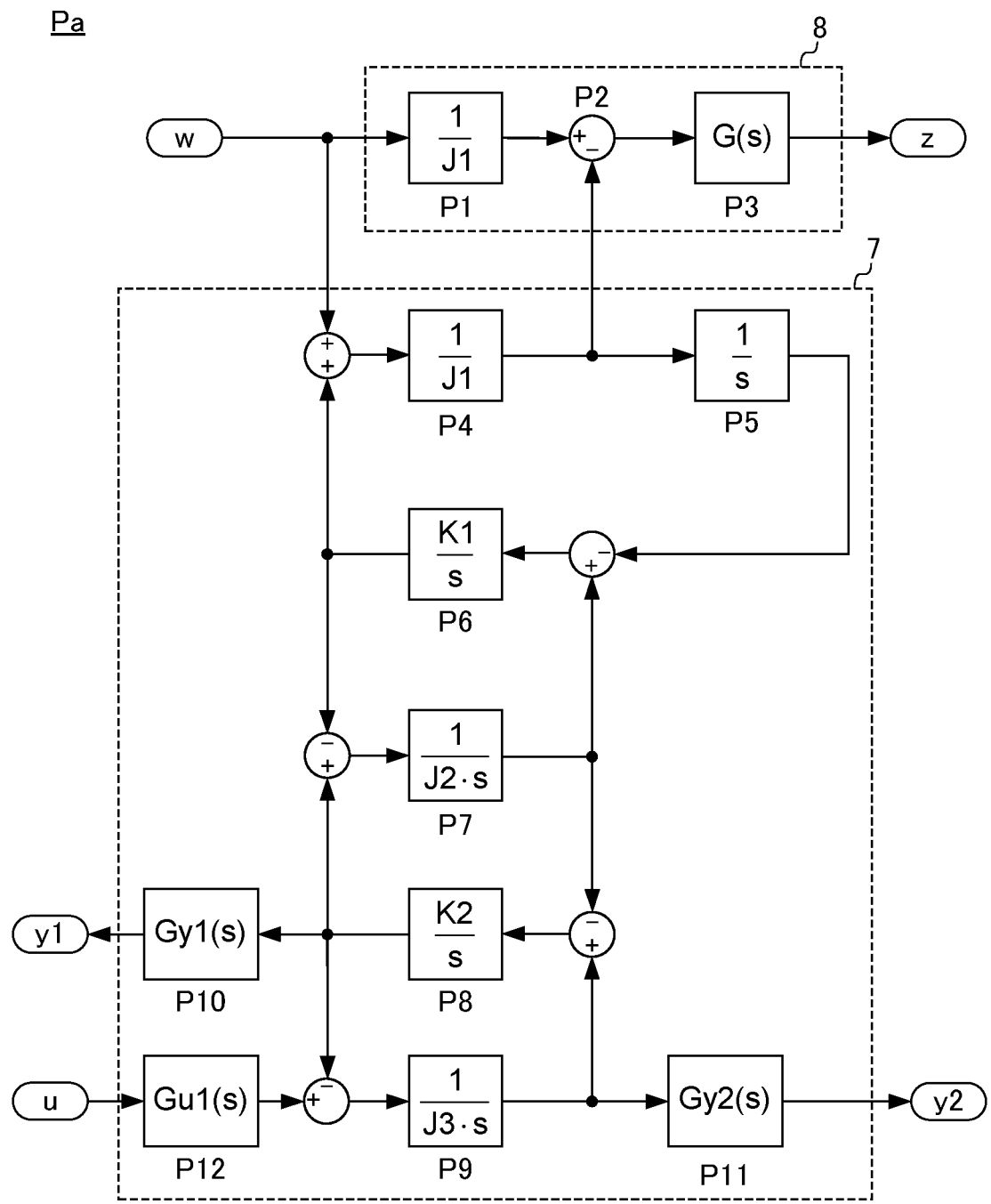
FIG. 3 is a diagram illustrating the detailed configuration of a generalized plant of Example 1.

FIG. 3 is a diagram illustrating the detailed configuration of the generalized plant Pa of Example 1. In a generalized plant Pa of Example 1, the input signal w indicates an external input and corresponds to engine torque generated in the engine. The input signal u indicates a control input output from a controller (not illustrated) and corresponds to a torque current command input to the inverter. The output signal z indicates a controlled variable and corresponds to a difference value which needs to be decreased according to an H ∞ control or a μ synthesis. The detailed content of the difference value will be described later. Two output signals y1 and y2 respectively indicate first and second observation outputs input to a controller (not illustrated) and correspond to the detection value of the shaft torque sensor and the detection value of the encoder.

The generalized plant Pa includes a dynamic characteristic model 7 which identifies the characteristics of the dynamometer system 1 illustrated in FIG. 1 so that the angular acceleration of the engine is output from the external input w and the control input u and a controlled variable calculation unit 8 which calculates the controlled variable z based on the external input w and the output of the dynamic characteristic model 7.

The dynamic characteristic model 7 includes mechanical models P4 to P9 identifying the characteristics of a three-inertia system obtained by connecting the engine, the shaft, and the dynamometer, a shaft torque detection model P10 identifying the shaft torque detection characteristics by the shaft torque sensor, a rotation speed detection model P11 identifying the rotation speed detection characteristics of the dynamometer by the encoder, and an inverter model P12 identifying the torque current control characteristics by the inverter.

Figure 4:
FIG. 4 is a diagram illustrating a three-inertia system model corresponding to a mechanical system of a dynamometer system.

The configuration of the mechanical system of the dynamometer system 1 can be approximated as a three-inertia system model obtained by connecting three rigid bodies each having an original inertia moment illustrated in FIG. 4 through two spring components. In FIGS. 3 and 4, "J1" corresponds to the inertia moment [kgm$^2$] of the engine, "J2" corresponds to the inertia moment [kgm$^2$] of the shaft, and "J3" corresponds to the inertia moment [kgm$^2$] of the dynamometer. "K1" corresponds to the spring stiffness [Nm/ rad] between the engine and the shaft and "K2" corresponds to the spring stiffness [Nm/rad] between the shaft and the dynamometer.

When the configuration of the mechanical system of the dynamometer system 1 is approximated as the three-inertia system model illustrated in FIG. 4, the motion equation is expressed by combining the transfer functions "1/J1", "1/s", "K1/s", "1/J2·s", "K2/s", and "1/J3·s" with the mechanical models P4 to P9 of FIG. 3. Furthermore, for example, specific values obtained in advance by an actual machine are used as the detailed values of these three inertia moments J1 to J3 and the spring constants K1 and K2.

The transfer function Gy1(s) of the shaft torque detection model P10, the transfer function Gy2(s) of the rotation speed detection model P11, and the transfer function Gu1(s) of the inverter model P12 are determined in advance for each system.

The controlled variable calculation unit 8 calculates a difference value obtained by subtracting the angular acceleration (the output of the block P4) of the engine calculated by the dynamic characteristic model 7 from the angular acceleration (the output of the block P1) of the engine unit obtained by multiplying the inverse number of the inertia moment J1 of the engine unit by the external input w corresponding to the engine torque and calculates the controlled variable z by multiplying a prescribed weighting function G(s) by the difference value. In the weighting function G(s), for example, a function having an integration characteristic is used. As described above, in the invention, a difference value between the angular acceleration of the engine unit and the angular acceleration of the engine calculated by the dynamic characteristic model is set as the controlled variable z and the controller is designed according to an H ∞ control or a μ synthesis so that the responsiveness from the external input w to the controlled variable z decreases. Thus, it is possible to derive a controller having both the shaft inertia compensation effect of compensating the shaft inertia of the dynamometer and the resonance suppression effect of suppressing the mechanical resonance.

Figure 5:
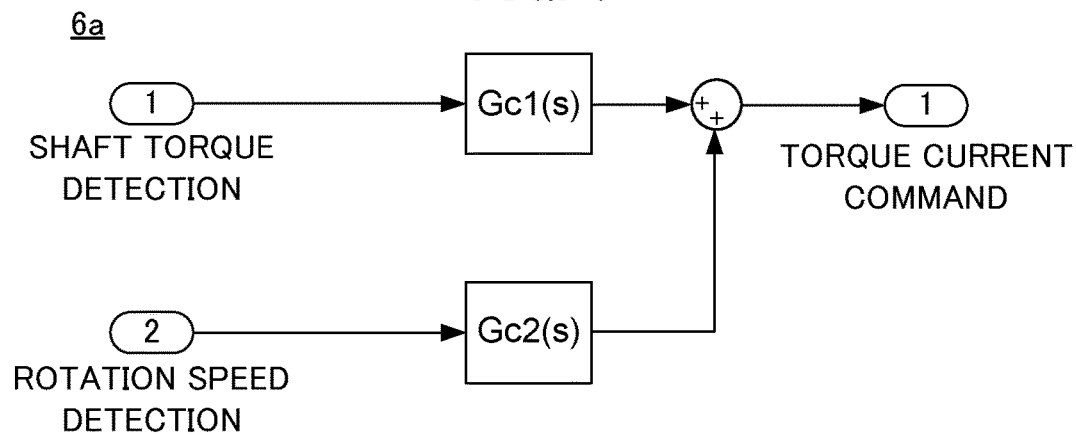
FIG. 5 is a diagram illustrating the detailed configuration of a dynamo control device of Example 1.

FIG. 5 is a diagram illustrating the detailed configuration of a dynamo control device 6a of Example 1. Two controllers Gc1 and Gc2 derived from the generalized plant Pa are used in the dynamo control device 6a. The controller Gc1 is derived so as to correspond to the first observation output y1, and the controller Gc2 is derived so as to correspond to the second observation output y2.

Figure 6:
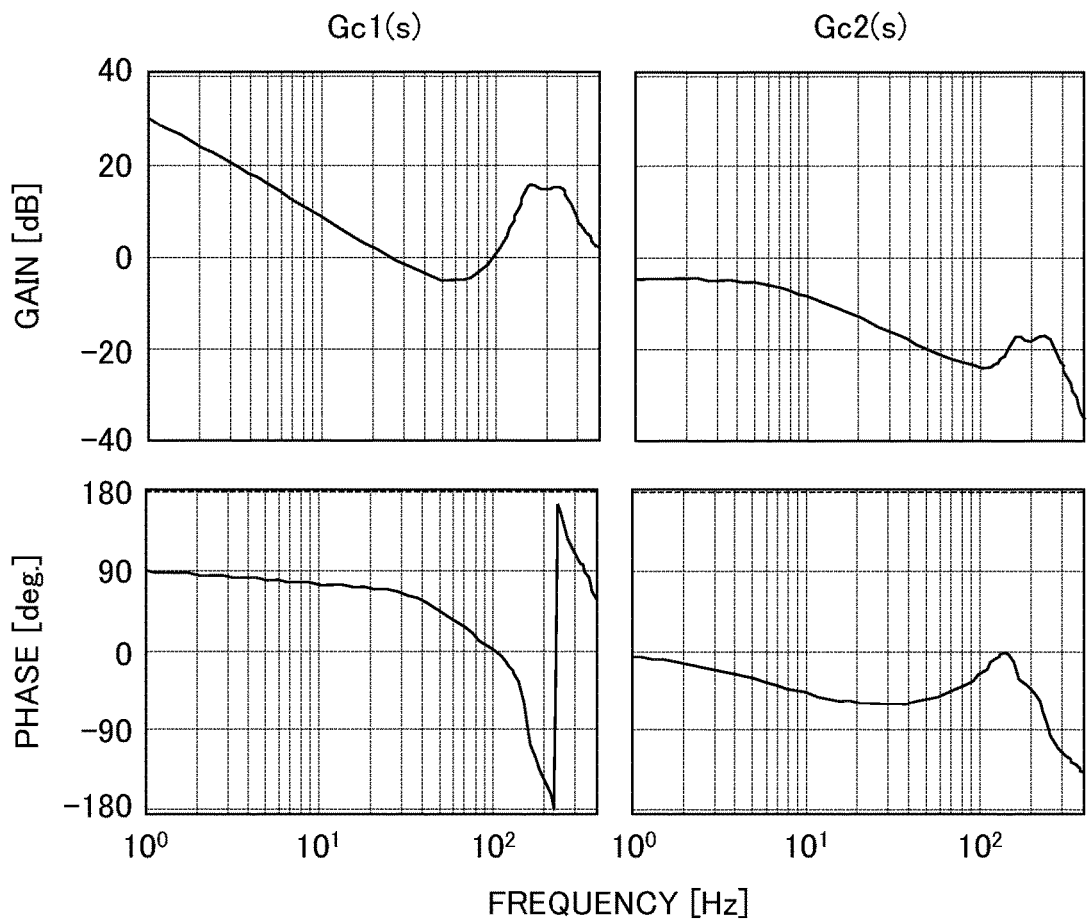
FIG. 6 is a bode diagram of a controller of Example 1.

FIG. 6 is a bode diagram of the controllers Gc1 and Gc2 of Example 1. In FIG. 6, the upper diagram indicates the gain characteristics and the lower diagram indicates the phase characteristics. As illustrated in FIG. 6, the integration characteristics are recognized in the low range of the controller Gc1 and the proportional characteristics are recognized in the low range of the controller Gc2. The integration characteristics and the proportional characteristics are used as control elements used to compensate the shaft inertia of the dynamometer. Meanwhile, a gain decreases at a prescribed mechanical resonance point in the high ranges of the controllers Gc1 and Gc2. From the description above, according to the controllers Gc1 and Gc2 and the dynamo control device 6a using the controllers, it is possible to apparently obtain both the shaft inertia compensation effect of compensating the shaft inertia in a no-load state in the engine and the resonance suppression effect of suppressing the mechanical resonance point.

Furthermore, the responsiveness of the shaft inertia compensation control can be evaluated based on the integration characteristics and the proportional characteristics of the controllers Gc1 and Gc2 at a certain frequency. For example, the controllers Gc1 and Gc2 of FIG. 6 have about 10 Hz of responsiveness.

Figure 7:
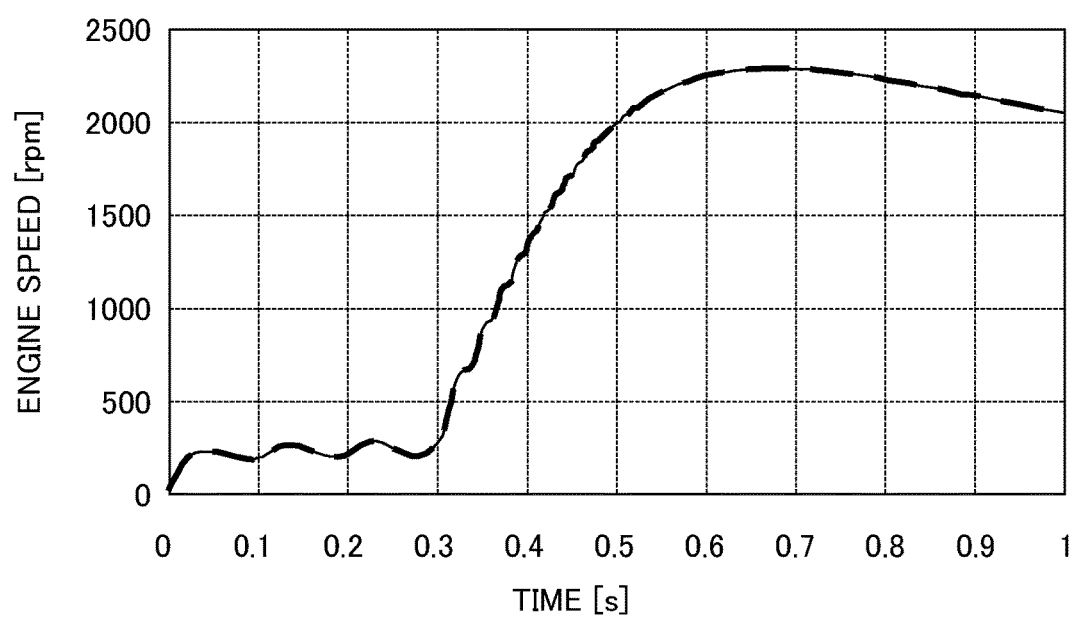
FIG. 7 is a diagram illustrating the change in engine speed when an engine is started in the dynamometer system using the dynamo control device of Example 1.

FIG. 7 is a diagram illustrating the change in engine speed when the engine is started in the dynamometer system using the dynamo control device of FIG. 6. In FIG. 7, a measurement result of the system that uses the dynamo control device of FIG. 6 is indicated by a thin solid line. Further, a bold dotted line indicates a result measured when the engine and the shaft are separated so that the engine actually gets into a no-load state, that is, an ideal value in the shaft inertia compensation. As illustrated in FIG. 7, the thin solid line and the bold dotted line substantially match each other. According to the system using the dynamo control device 6a of this example, since the shaft inertia of the dynamometer is compensated when the engine is started, a starting waveform corresponding to the engine unit is certainly obtained. That is, it is verified that the no-load state of the engine can be realized by using the dynamo control device of this example.

EXAMPLE 2

Figure 8:
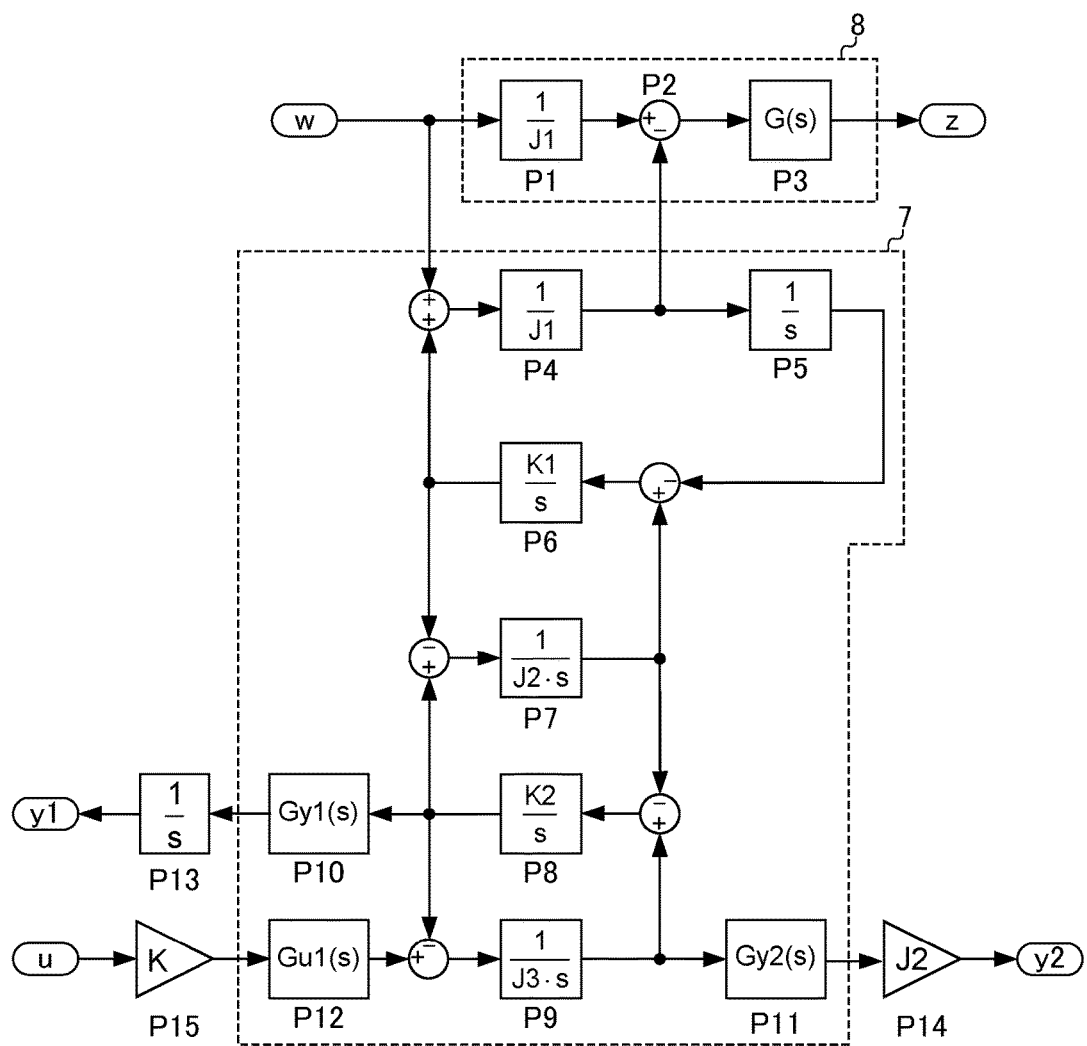
FIG. 8 is a diagram illustrating the detailed configuration of a generalized plant of Example 2.

FIG. 8 is a diagram illustrating the detailed configuration of a generalized plant Pb of Example 2. In the description below, only the difference from the generalized plant Pa of Example 1 of FIG. 3 will be described. The same reference numerals will be given to the same components as those of the generalized plant Pa of Example 1, and the detailed description thereof will be omitted.

As described above by referring to FIG. 6, the controller derived to obtain the shaft inertia compensation effect has the integration characteristics and the proportional characteristics as a result. In Example 2, the generalized plant Pb having the control element is used in order to separate the control element essential for obtaining the shaft inertia compensation effect from the controller.

The generalized plant Pb of this example additionally includes an integrator P13 and two gain blocks P14 and P15 from the generalized plant Pa of Example 1. More specifically, in Example 2, the output of the integrator P13 provided in the output terminal of the torque detection model P10 is set as the first observation output y1, and the output of the gain block P14 of the inertia moment J2 of the shaft provided in the output terminal of the rotation speed detection model P11 is set as the second observation output y2. Further, in Example 2, an output obtained by multiplying a prescribed proportional gain K as the reference of the control responsiveness by the control input u is set as an input of the inverter model P12.

Figure 9:
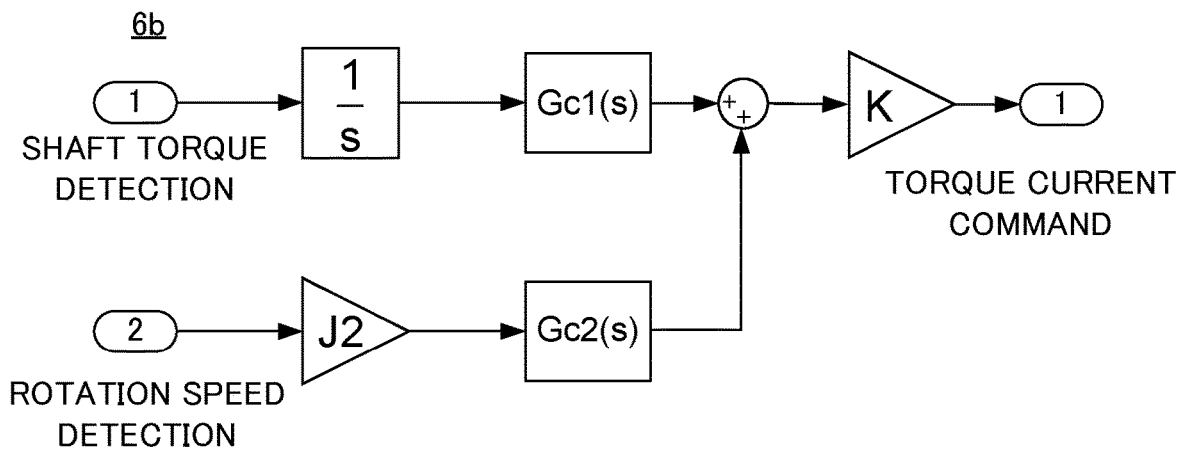
FIG. 9 is a diagram illustrating the detailed configuration of a dynamo control device of Example 2.

FIG. 9 is a diagram illustrating the detailed configuration of a dynamo control device 6b of Example 2. Two controllers Gc1(s) and Gc2(s) derived from the generalized plant Pb are used in the dynamo control device 6b. The controller Gc1 is obtained so as to correspond to the first observation output y1, and the controller Gc2 is obtained so as to correspond to the second observation output y2. Here, since the integrator and the proportional gain are included in the generalized plant Pb in advance as described above, the characteristics of the integrator and the proportional gain are separated from the derived controllers Gc1 and Gc2. For this reason, the dynamo control device 6b additionally includes an integrator and two proportional gains K and J2 essential for the shaft inertia compensation control as illustrated in FIG. 9 other than the two controllers Gc1 and Gc2 derived from the generalized plant Pb.

Figure 10:
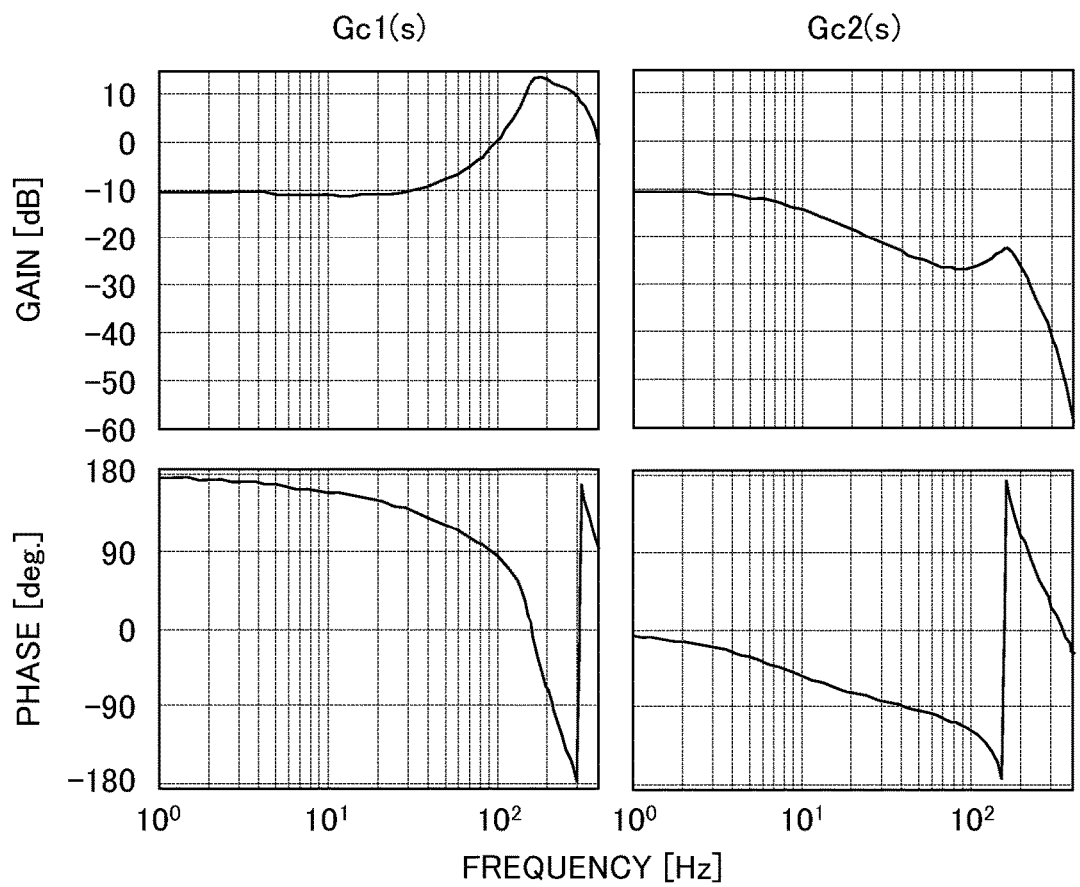
FIG. 10 is a bode diagram of controllers Gc1 and Gc2 of Example 2.

FIG. 10 is a bode diagram of the controllers Gc1 and Gc2 of Example 2. In FIG. 10, the upper diagram indicates the gain characteristics and the lower diagram indicates the phase characteristics. According to this example, since the integrator or the proportional gain is included in the generalized plant Pb, the controllers Gc1 and Gc2 having the same gain proportional characteristics in the low range are derived. In this way, since both controllers Gc1 and Gc2 have the same gain in the low range, there is an advantage that the responsiveness is easily evaluated compared with the case where the generalized plant Pa of Example 1 is used.

Furthermore, it is effective to feed back the high-range shaft torque signal in order to obtain the resonance suppression effect. However, as illustrated in FIG. 9, the shaft torque signal is attenuated in the high range by the integrator and is set as an input of the controller Gc1. On the contrary, according to the controller Gc1 of this example, the high-range gain increases so as to compensate the attenuation in the high range due to the integrator. Thus, the resonance suppression effect is not impaired compared with Example 1.

Further, for example, when the generalized plant Pa of Example 1 is used, the characteristic of the inertia compensation amount is included in the controller Gc2 of FIG. 5. For this reason, when the controller is derived and the inertia compensation amount is changed, the controller needs to be derived again by an H ∞ control or a μ synthesis. On the contrary, when the generalized plant Pb of this example is used, the characteristic of the inertia compensation amount is separated from the controller Gc2 as the gain block J2 of the shaft inertia moment as illustrated in FIG. 9. Thus, according to this example, the inertia compensation amount can be easily changed by the adjustment of the gain J2 without using an H ∞ control or a μ synthesis again even after the controller is derived by the H ∞ control or the μ synthesis. Further, a gain block K as a loop gain is also separated from the controllers Gc1 and Gc2. For this reason, the loop gain can be easily changed within a certain range without performing the H ∞ control or the μ synthesis again similarly to the inertia compensation amount. Furthermore, although not illustrated and described in detail, the same effect as FIG. 7 can be obtained even in the dynamometer system using the dynamo control device 6b of Example 2.

EXAMPLE 3

Figure 11:
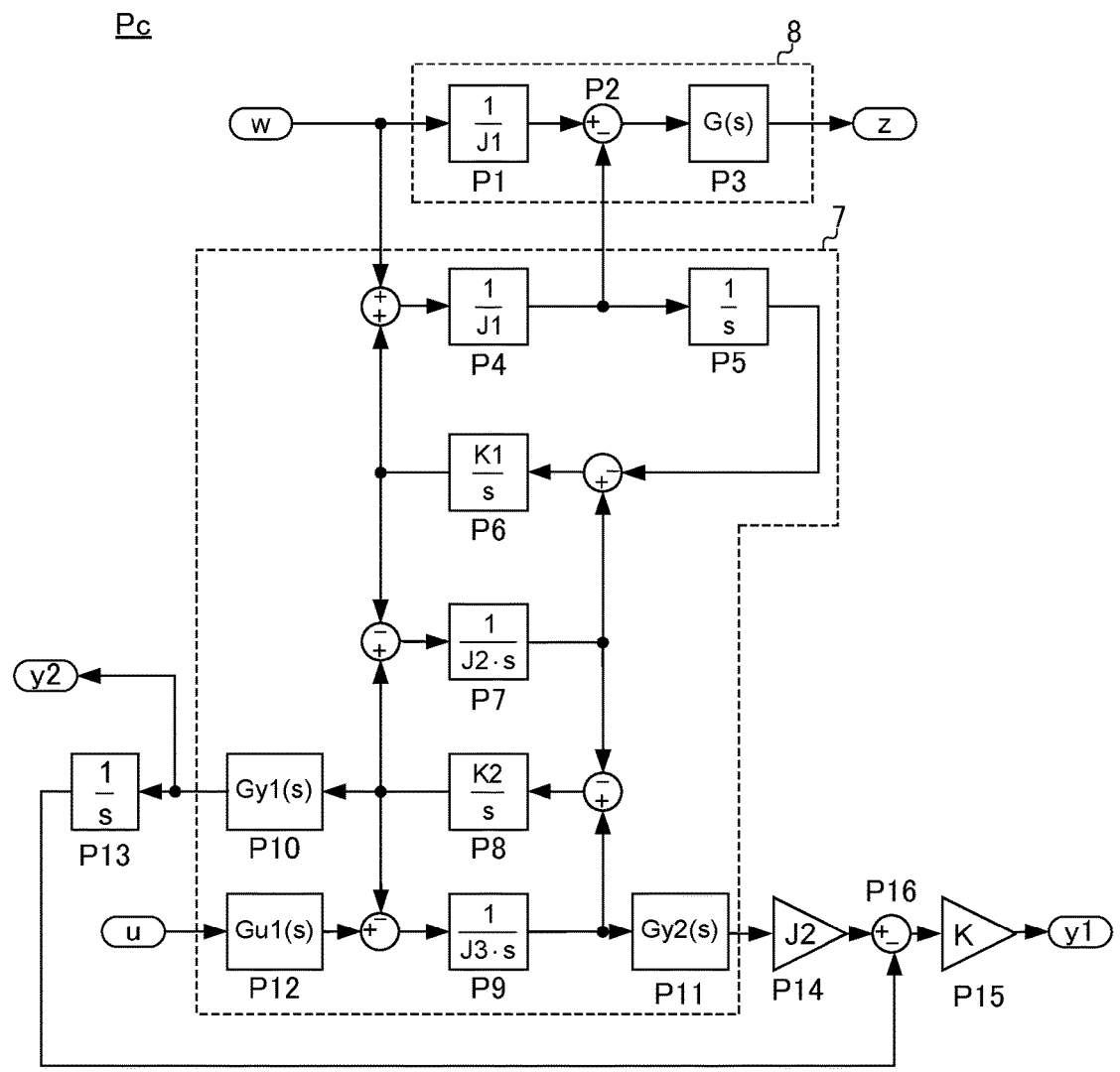
FIG. 11 is a diagram illustrating the detailed configuration of a generalized plant of Example 3.

FIG. 11 is a diagram illustrating the detailed configuration of a generalized plant Pc of Example 3. In the description below, only the difference from the generalized plant Pa of Example 1 of FIG. 3 will be described. The same reference numerals will be given to the same components as those of the generalized plant Pa of Example 1, and the detailed description thereof will be omitted.

Similarly to Example 2, in this example, the generalized plant Pc including the control element, such as the integrator or the proportional gain essential for obtaining the shaft inertia compensation effect, is used in order to separate the control element from the controller.

In the generalized plant Pc of this example, the integrator 13, two gain blocks P14 and P15, and an adder P16 are added from the generalized plant Pa of Example 1. More specifically, in Example 3, an output obtained by multiplying a prescribed proportional gain K as the reference of the control responsiveness by an output obtained by subtracting the output of the integrator P13 provided in the output terminal of the torque detection model P10 from the output of the gain block P14 of the shaft inertia moment J2 provided in the output terminal of the rotation speed detection model P11 is set as the first observation output y1. Further, the output of the torque detection model P10 is set as the second observation output y2.

Figure 12:
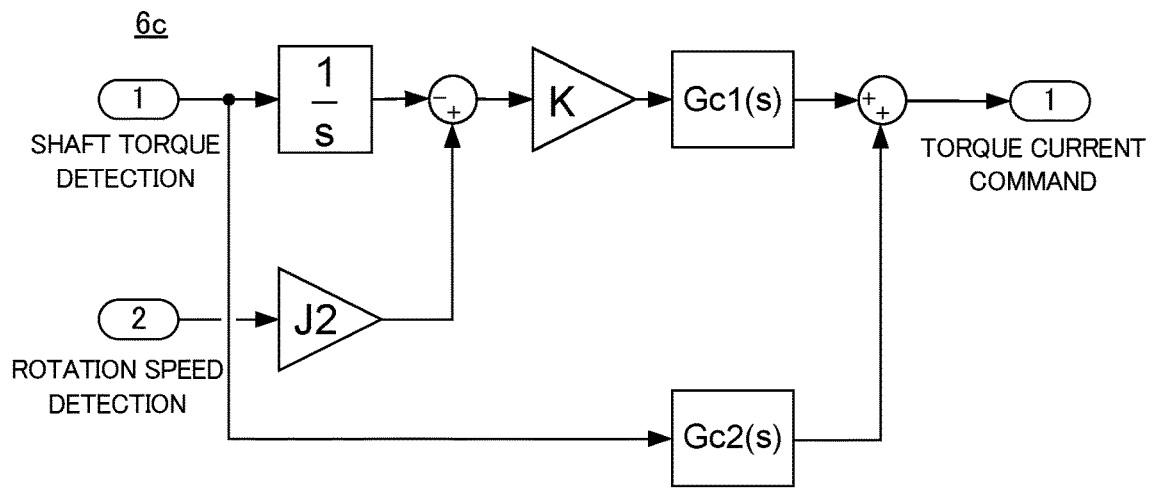
FIG. 12 is a diagram illustrating the detailed configuration of a dynamo control device of Example 3.

FIG. 12 is a diagram illustrating the detailed configuration of a dynamo control device 6c of Example 3. Two controllers Gc1(s) and Gc2(s) derived from the generalized plant Pc are used in the dynamo control device 6c. The controller Gc1 is obtained so as to correspond to the first observation output y1, and the controller Gc2 is obtained so as to correspond to the second observation output y2. Here, due to the same reason as Example 2, the dynamo control device 6c additionally includes an integrator and two proportional gains K and J2 essential for the shaft inertia compensation control as illustrated in FIG. 12 other than the two controllers Gc1 and Gc2 derived from the generalized plant Pc.

Figure 13:
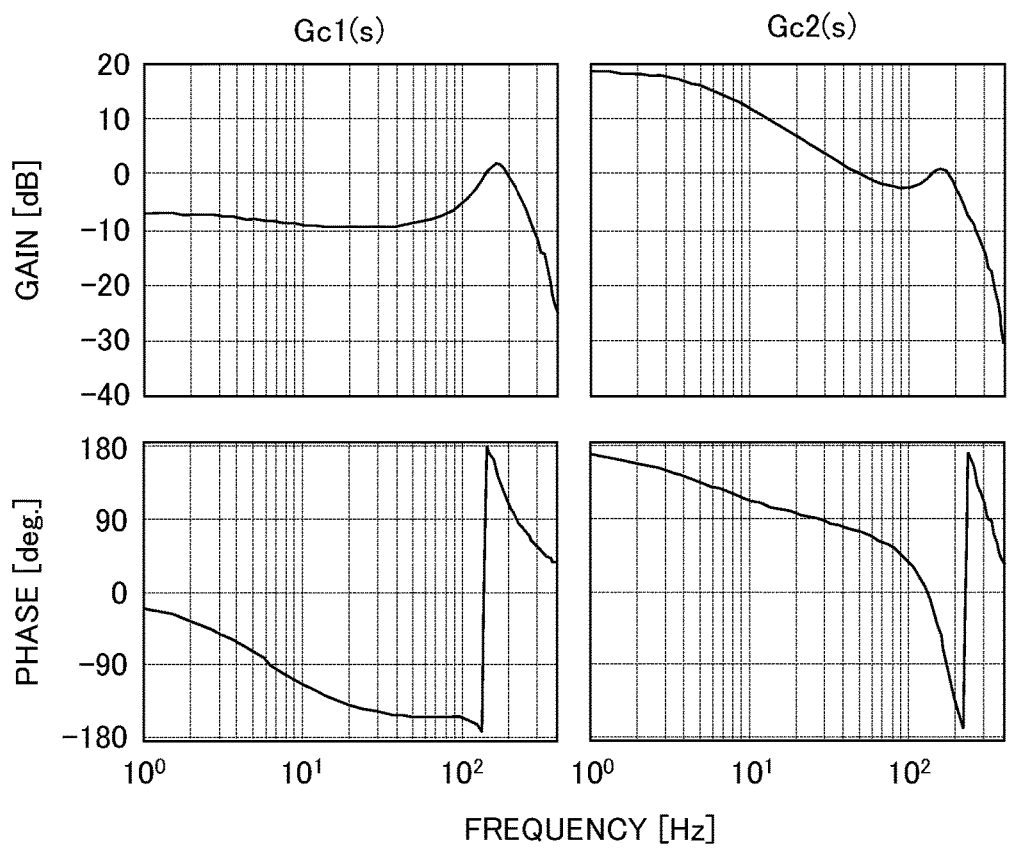
FIG. 13 is a bode diagram of controllers Gc1 and Gc2 of Example 3.

FIG. 13 is a bode diagram of the controllers Gc1 and Gc2 of this example. In FIG. 13, the upper diagram indicates the gain characteristics and the lower diagram indicates the phase characteristics. According to this example, since the integrator or the proportional gain is included in the generalized plant Pc, the substantially same effect as Example 2 is obtained. Furthermore, according to this example, the controller effective for the shaft inertia compensation control only corresponds to the controller Gc1. As described above in Example 2, since a signal attenuated in the high range by the integrator is set as an input of the controller Ge1, the high-range gain of the controller Gc1 increases. However, in this example, since the shaft torque detection signal of the controller Gc2 is fed back as illustrated in FIG. 13, the high-range gain of the controller Gc1 is small compared with Example 2. Furthermore, although not illustrated and described in detail, even in the dynamometer system using the dynamo control device 6b of Example 3, the same effect as FIG. 7 can be obtained.

EXAMPLE 4

Figure 14:
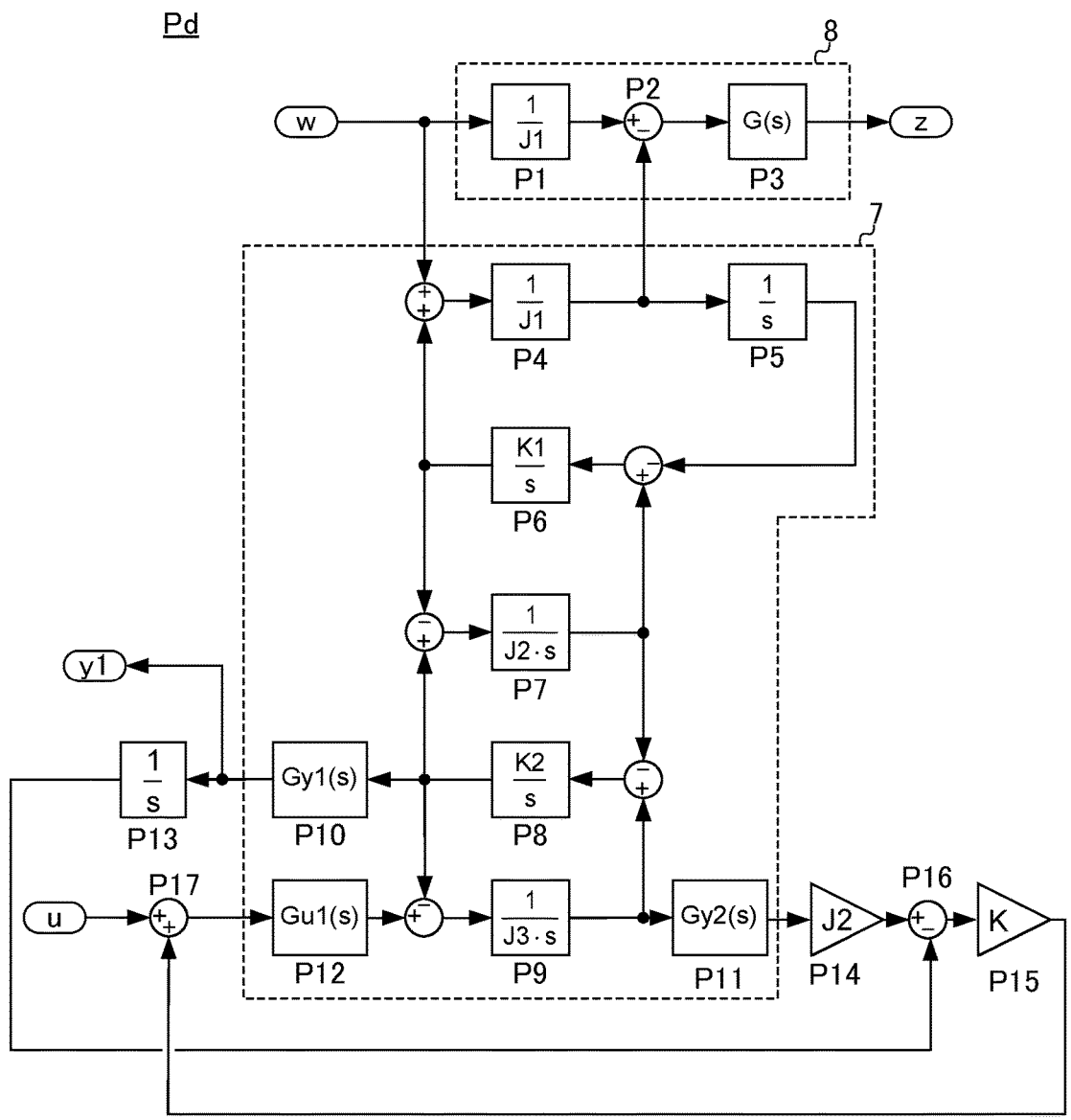
FIG. 14 is a diagram illustrating the detailed configuration of a generalized plant of Example 4.

FIG. 14 is a diagram illustrating the detailed configuration of a generalized plant Pd of Example 4. In the description below, only the difference from the generalized plant Pa of Example 1 of FIG. 3 will be described. The same reference numerals will be given to the same components as those of the generalized plant Pa of Example 1, and the detailed description thereof will be omitted.

Similarly to Example 2, in this example, the generalized plant Pd including the control element, such as the integrator or the proportional gain essential for obtaining the shaft inertia compensation effect, is used in order to separate the control element from the controller. Further, in Example 1, two observation outputs y1 and y2 are defined, but in this example only the observation output y1 is used.

In the generalized plant Pd of this example, the integrator P13, two gain blocks P14 and P15, and two adders P16 and P17 are added from the generalized plant Pa of Example 1. More specifically, in Example 4, the output of the torque detection model P10 is set as the observation output y1. Further, an output obtained by combining the control input u with the output obtained by multiplying a prescribed proportional gain K as the reference of the control responsiveness by a difference value obtained by subtracting the output of the integrator P13 provided in the output terminal of the torque detection model P10 from the output of the rotation speed detection model P11 multiplied by the inertia moment J2 of the shaft is set as an input of the inverter model P12.

Figure 15:
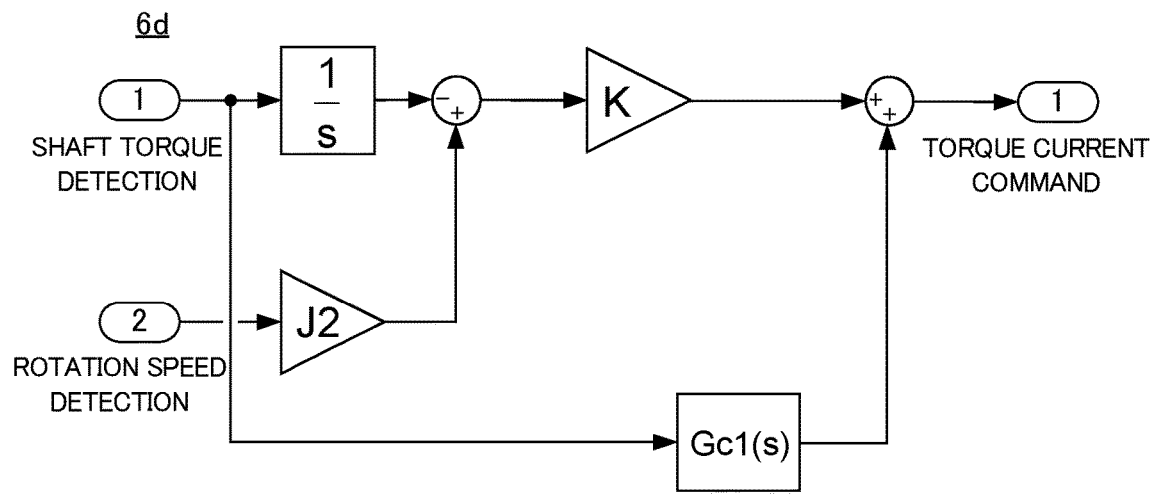
FIG. 15 is a diagram illustrating the detailed configuration of a dynamo control device of Example 4.

FIG. 15 is a diagram illustrating the detailed configuration of the dynamo control device 6d of Example 4. The controller Gc1(s) derived from the generalized plant Pd so as to correspond to the observation output y1 is used in the dynamo control device 6d. Here, due to the same reason as Example 2, the dynamo control device 6d additionally includes an integrator and two proportional gains K and J2 essential for the shaft inertia compensation control as illustrated in FIG. 15 other than the controller Gc1 derived from the generalized plant Pd.

Figure 16:
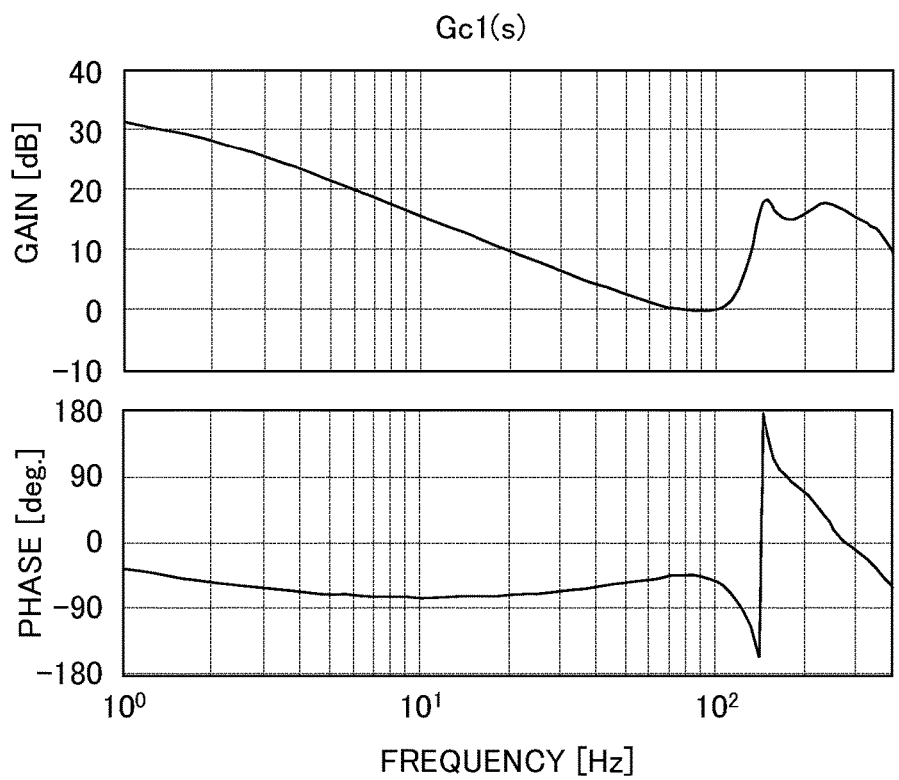
FIG. 16 is a bode diagram of a controller Gc1 of Example 4.

FIG. 16 is a bode diagram of the controller Gc1 of this example. In FIG. 16, the upper diagram indicates the gain characteristics and the lower diagram indicates the phase characteristics. According to this example, since the integrator or the proportional gain is included in the generalized plant Pd, the substantially same effect as Example is obtained. Furthermore, in this example, since only the observation output y1 of the generalized plant Pd is used, only one high-order controller Gc1 is used. For this reason, according to this example, a bumpless process is easily performed when the shaft inertia compensation control is switched to a different control. Furthermore, although not illustrated and described in detail, even in the dynamometer system using the dynamo control device 6d of Example 4, the same effect as FIG. 7 can be obtained.

EXAMPLE 5

Figure 17:
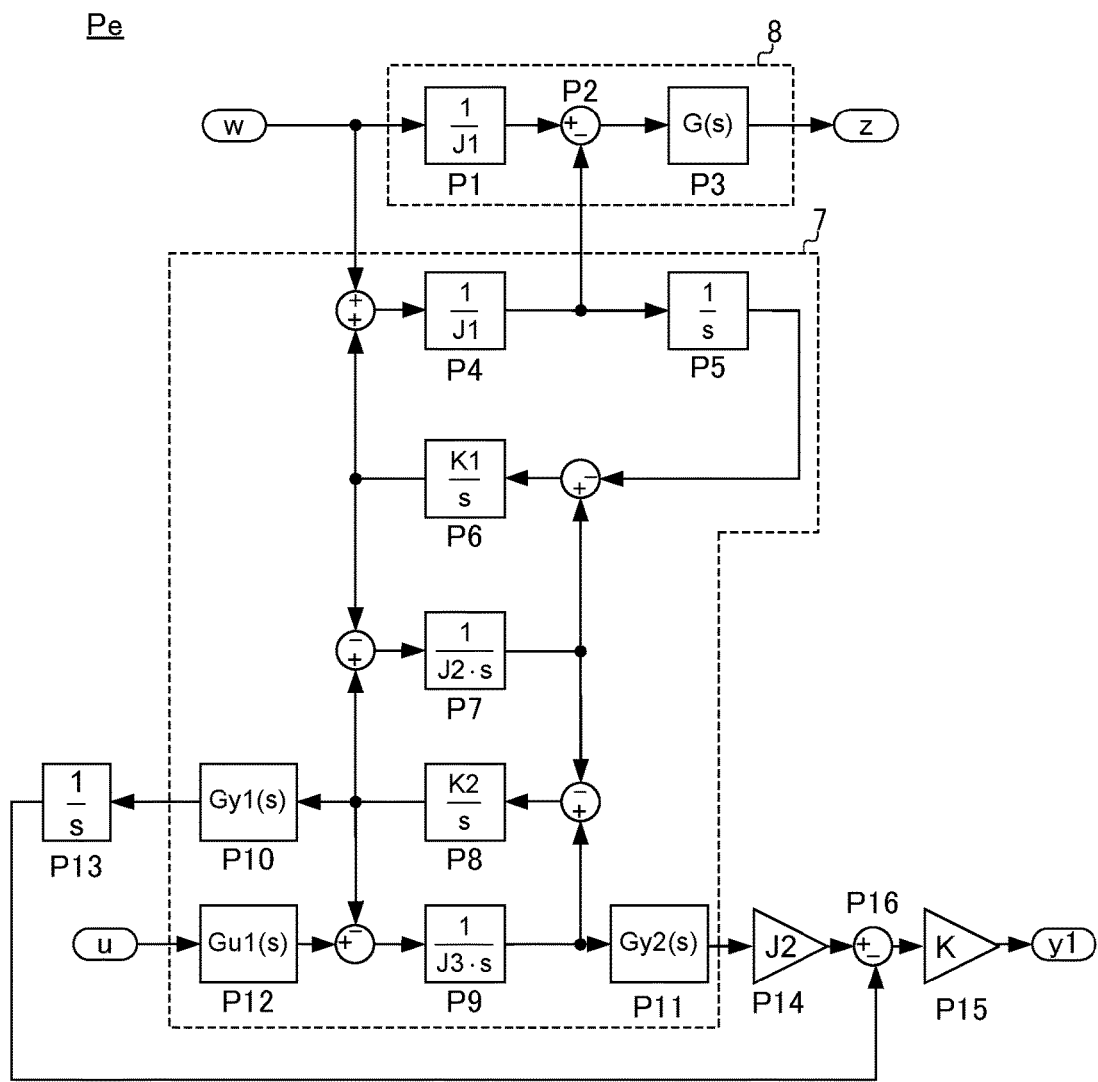
FIG. 17 is a diagram illustrating the detailed configuration of a generalized plant of Example 5.

FIG. 17 is a diagram illustrating the detailed configuration of a generalized plant Pe of Example 5. In the description below, only the difference from the generalized plant Pc of Example 3 of FIG. 11 will be described. The same reference numerals will be given to the same components as those of the generalized plant Pc of Example 3, and the detailed description thereof will be omitted.

In the generalized plant Pc of Example 3, the output of the torque detection model P10 is set as the observation output y2. However, in the generalized plant Pe of this example, the output is deleted and only one observation output is used. That is, in the generalized plant Pe of this example, an output obtained by multiplying a prescribed proportional gain K as the reference of the control responsiveness by an output obtained by subtracting the output of the integrator P13 provided in the output terminal of the torque detection model P10 from the output of the gain block P14 of the inertia moment J2 of the shaft provided in the output terminal of the rotation speed detection model P11 is set as the observation output y1.

Figure 18:
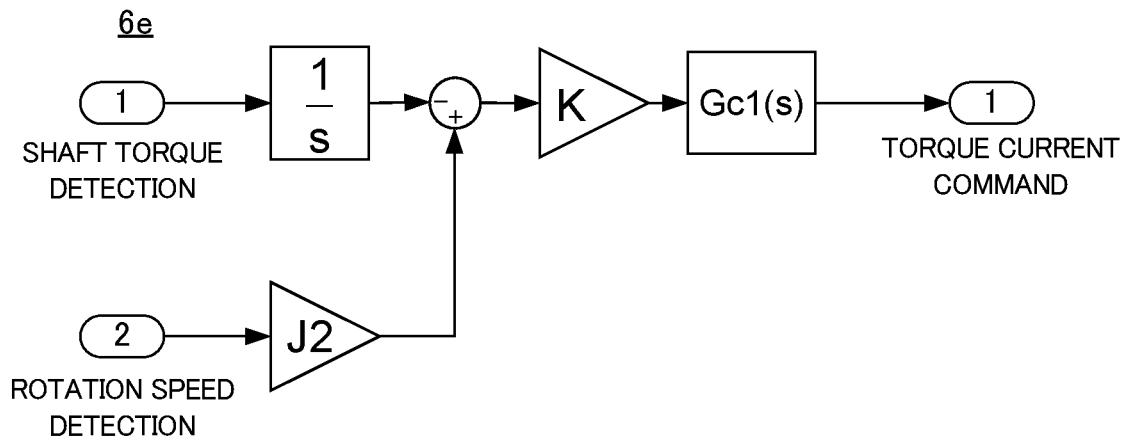
FIG. 18 is a diagram illustrating the detailed configuration of a dynamo control device of Example 5.

FIG. 18 is a diagram illustrating the detailed configuration of a dynamo control device 6e of Example 5. The controller Gc1(s) derived from the generalized plant Pe so as to correspond to the observation output y1 is used in the dynamo control device 6e. Here, due to the same reason as Example 2, the dynamo control device 6e additionally includes an integrator and two proportional gains K and J2 essential for the shaft inertia compensation control as illustrated in FIG. 18 other than the controller Gc1 derived from the generalized plant Pe.

Figure 19:
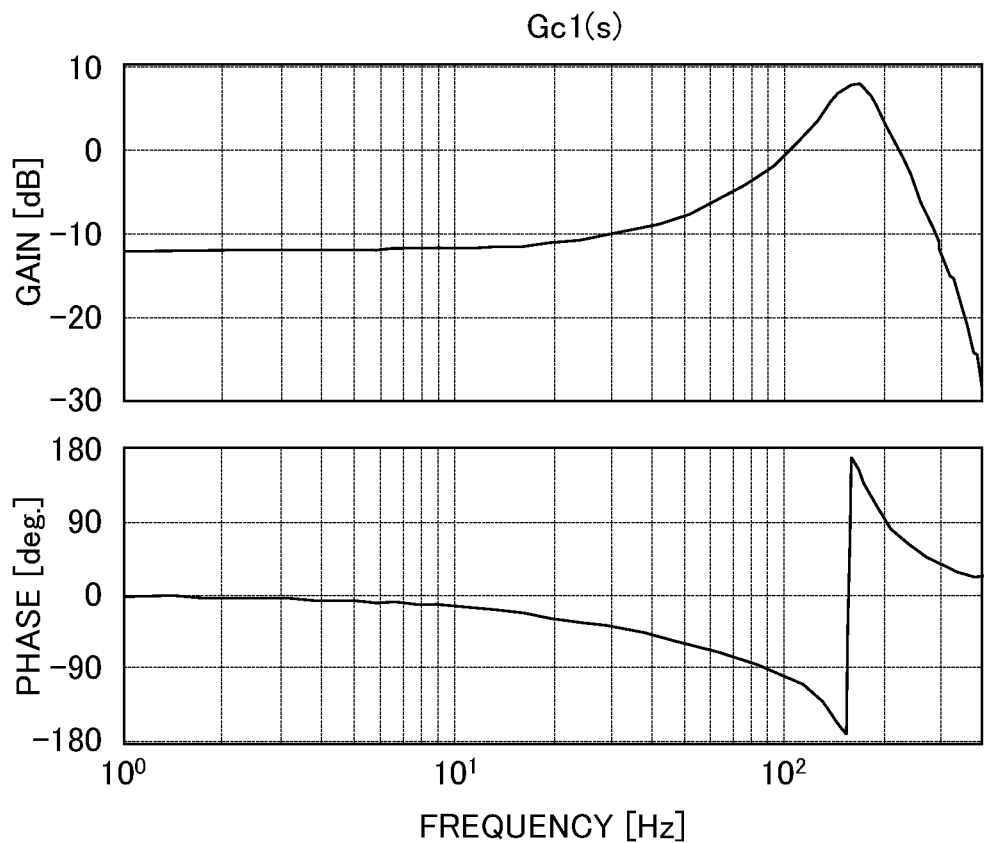
FIG. 19 is a bode diagram of a controller Gc2 of Example 5.

FIG. 19 is a bode diagram of the controller Gc1 of Example 5. In FIG. 19, the upper diagram indicates the gain characteristics and the lower diagram indicates the phase characteristics. According to this example, since the integrator or the proportional gain is included in the generalized plant Pd, the substantially same effect as Example 2 is obtained. Particularly, when the gain block K as the loop gain is separated from the controller Gc1 (see FIG. 18), the loop gain can be easily changed within a certain range without performing the H ∞ control or the μ synthesis again.

Furthermore, in this example, since only one observation output y1 of the generalized plant Pe is used, only one high-order controller Gc1 is derived. For this reason, according to this example, a bumpless process is easily performed when the shaft inertia compensation control is switched to a different control. Furthermore, although not illustrated and described in detail, even in the dynamometer system using the dynamo control device 6e of Example 5, the same effect as FIG. 7 can be obtained.

EXAMPLE 6

Figure 20:
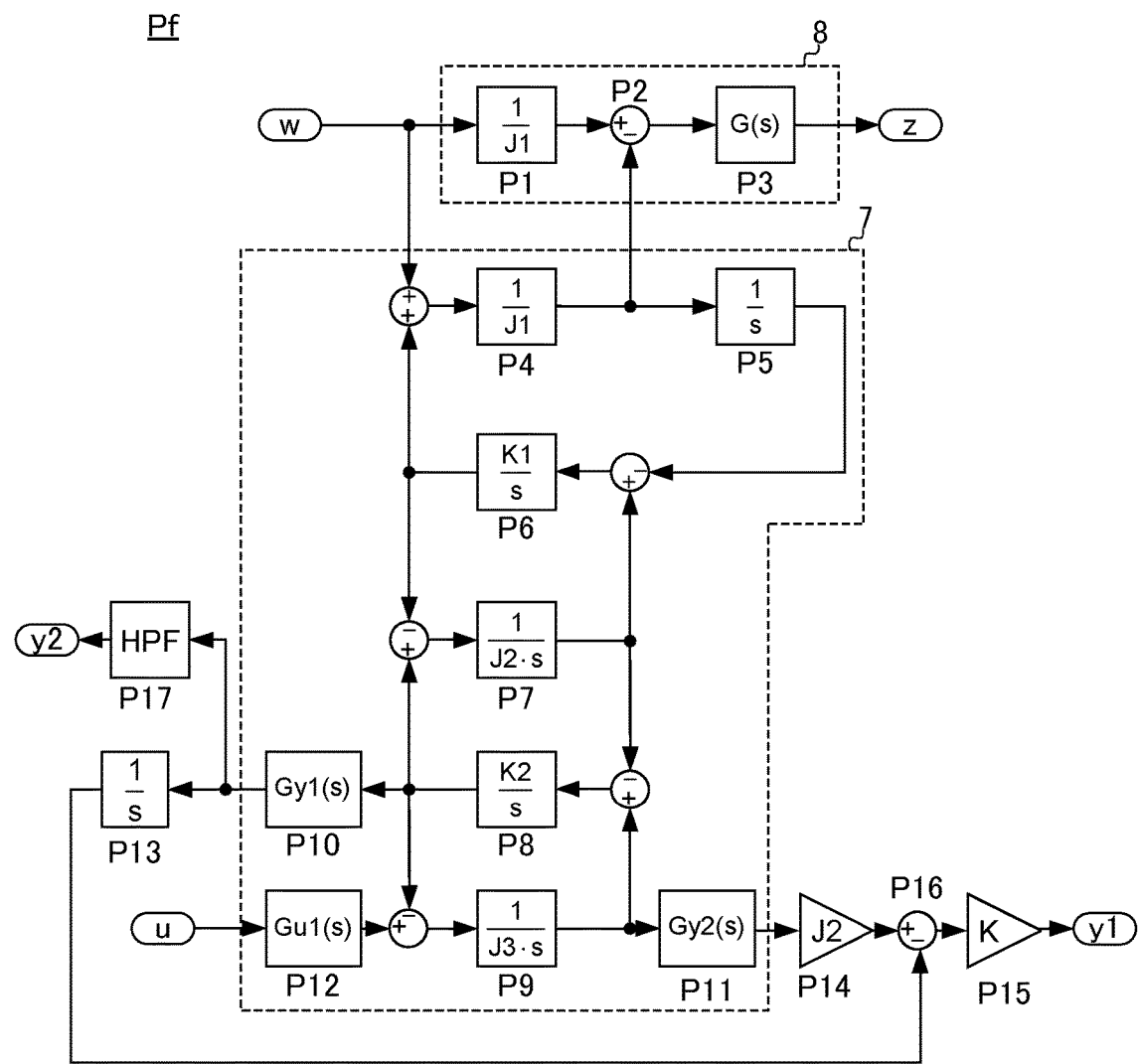
FIG. 20 is a diagram illustrating the detailed configuration of a generalized plant of Example 6.

FIG. 20 is a diagram illustrating the detailed configuration of a generalized plant Pf of Example 6. In the description below, only the difference from the generalized plant Pc of Example 3 of FIG. 11 will be described. The same reference numerals will be given to the same components as those of the generalized plant Pc of Example 3, and the detailed description thereof will be omitted.

In the generalized plant Pf of this example, a high-pass filter P17 is added from the generalized plant Pc of Example 3. More specifically, in Example 6, the output of the high-pass filter P17 provided in the output terminal of the torque detection model P10 is set as the second observation output y2. The first observation output y1 is similar to that of Example 3.

Figure 21:
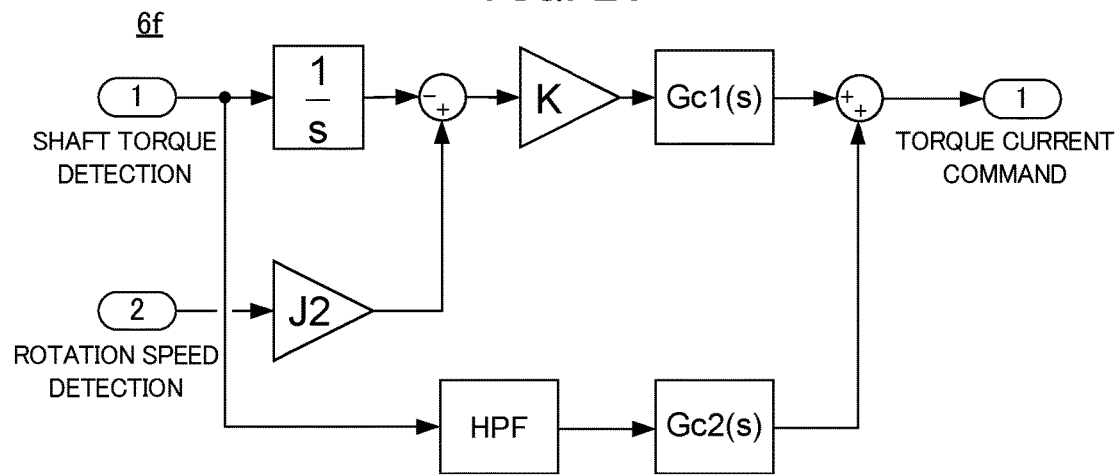
FIG. 21 is a diagram illustrating the detailed configuration of a dynamo control device of Example 6.

FIG. 21 is a diagram illustrating the detailed configuration of a dynamo control device 6f of Example 6. Two controllers Gc1(s) and Gc2(s) derived from the generalized plant Pf are used in the dynamo control device 6f. The controller Gc1 is derived so as to correspond to the first observation output y1, and the controller Gc2 is derived so as to correspond to the second observation output y2. Here, due to the same reason as Example 3, the dynamo control device 6f additionally includes an integrator, two proportional gains K and J2, and a high-pass filter essential for the shaft inertia compensation control as illustrated in FIG. 21 other than two controllers Gc1 and Gc2 derived from the generalized plant Pf.

Figure 22:
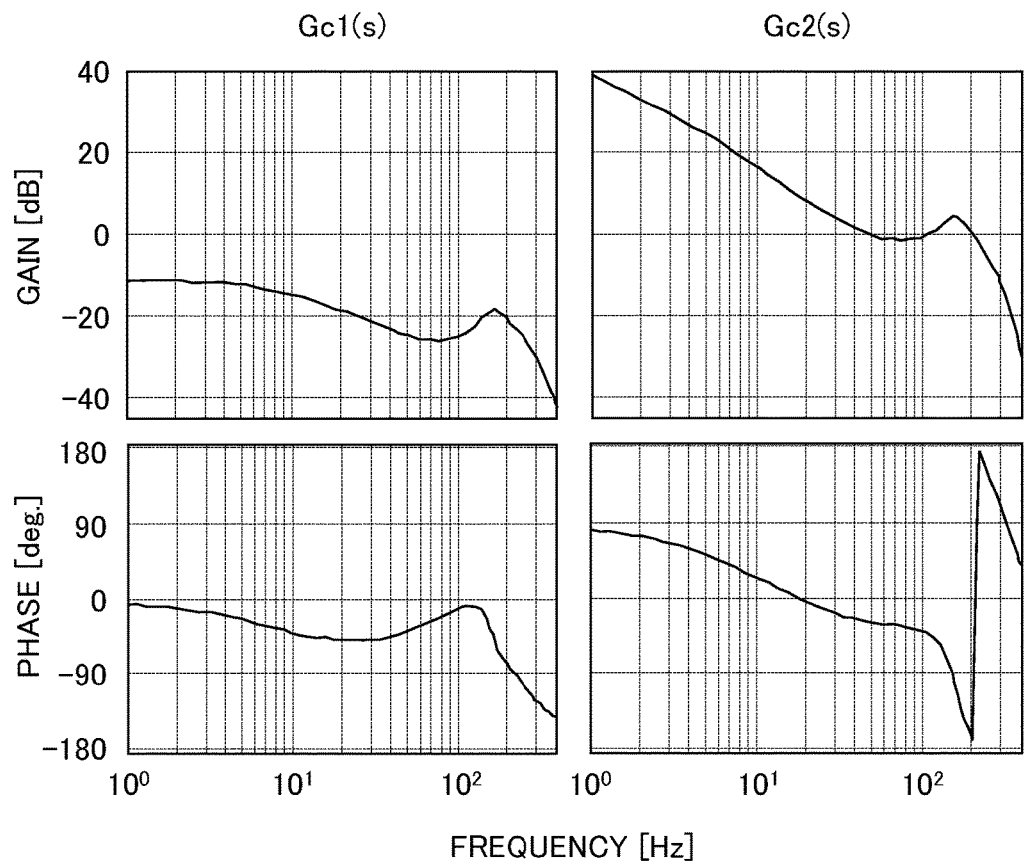
FIG. 22 is a bode diagram of controllers Gc1 and Gc2 of Example 6.

FIG. 22 is a bode diagram of the controllers Gc1 and Gc2 of this example. In FIG. 22, the upper diagram indicates the gain characteristics and the lower diagram indicates the phase characteristics. According to this example, since the integrator or the proportional gain is included in the generalized plant Pf, the substantially same effect as Example is obtained. Furthermore, in this example, a high-pass filter is added compared with Example 3. Comparing with the result of Example 3 illustrated in FIG. 13, the low-range characteristics of the controller Gc2 become the proportional characteristics in Example 3. However, in this example, the low-range characteristics of the controller Gc2 become the integration characteristics due to the effect of the high-pass filter. Furthermore, although not illustrated and described in detail, even in the dynamometer system using the dynamo control device 6f of Example 3, the same effect as FIG. 7 can be obtained.

EXAMPLE 7

Figure 23:
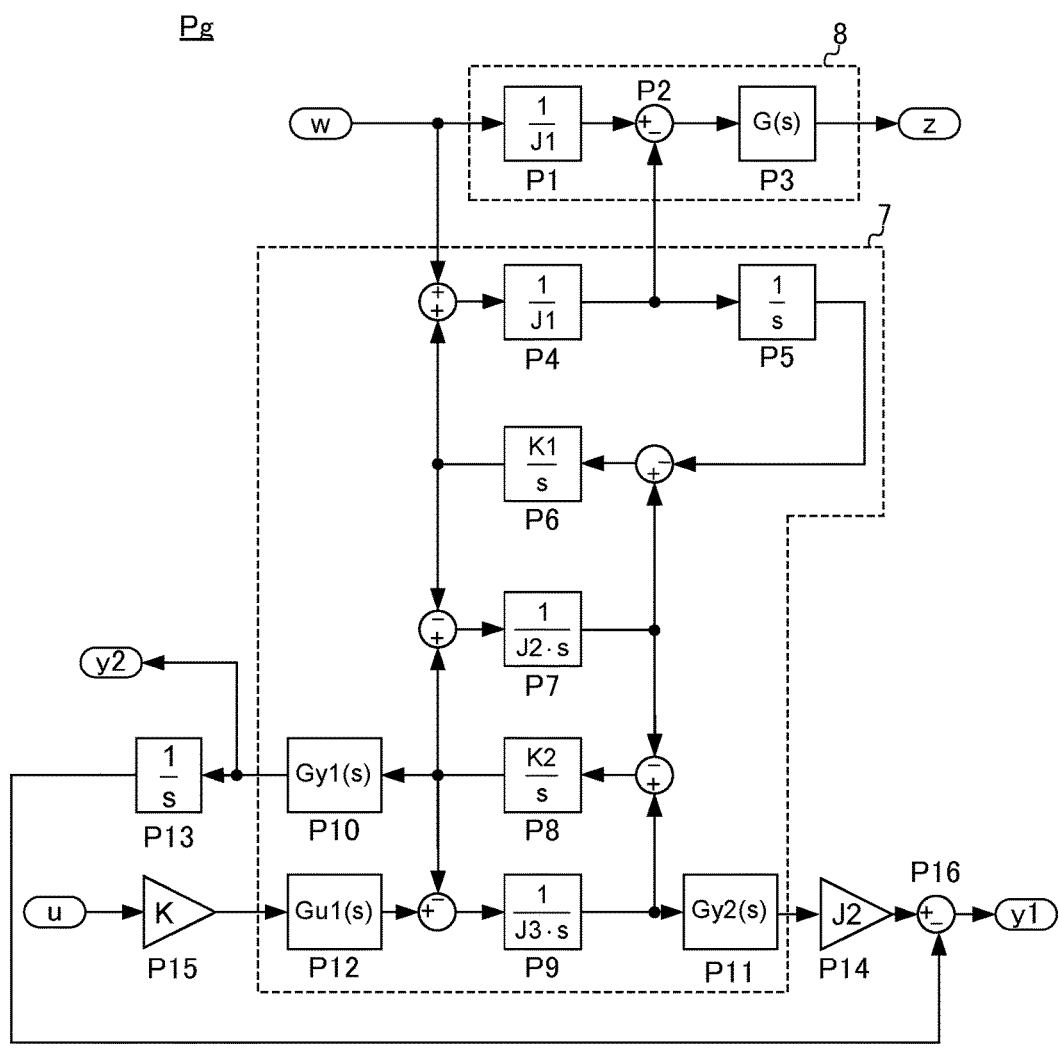
FIG. 23 is a diagram illustrating the detailed configuration of a generalized plant of Example 7.

FIG. 23 is a diagram illustrating the detailed configuration of a generalized plant Pg of Example 7. In the description below, only the difference from the generalized plant Pc of Example 3 of FIG. 11 will be described. The same reference numerals will be given to the same components as those of the generalized plant Pc of Example 3, and the detailed description thereof will be omitted.

The generalized plant Pc (see FIG. 11) of Example 3 and the generalized plant Pg (see FIG. 23) of this example have a different installation position of the gain block P14 multiplied by the proportional gain K. In this example, an output obtained by multiplying the control input u by a prescribed proportional gain K as the reference of the control responsiveness is set as an input of the inverter model P12.

Figure 24:
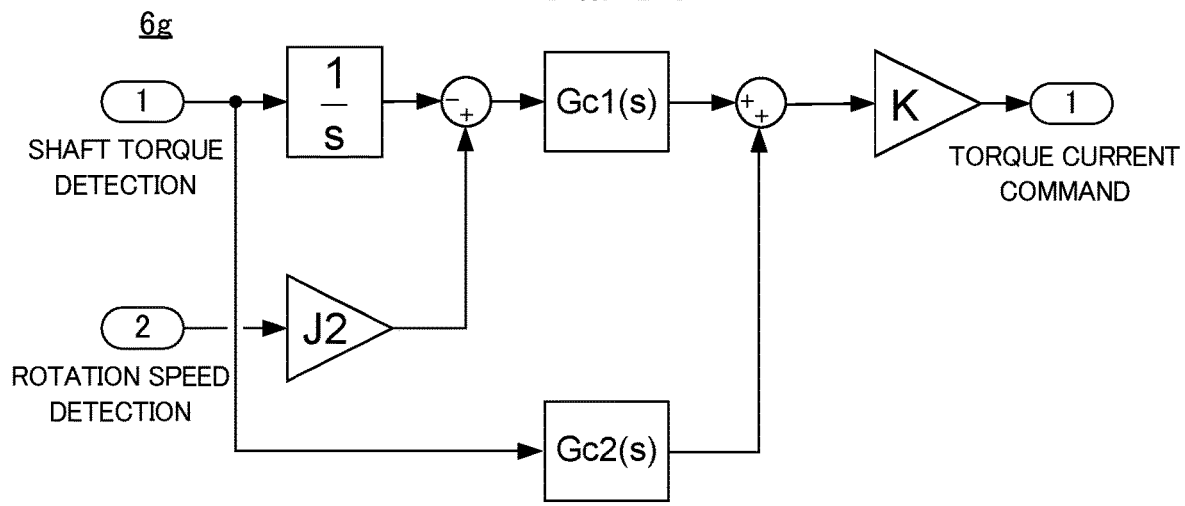
FIG. 24 is a diagram illustrating the detailed configuration of a dynamo control device of Example 7.

FIG. 24 is a diagram illustrating the detailed configuration of a dynamo control device 6g of Example 7. Two controllers Gc1(s) and Gc2(s) derived from the generalized plant Pg are used in the dynamo control device 6g. The controller Gc1 is obtained so as to correspond to the first observation output y1, and the controller Gc2 is obtained so as to correspond to the second observation output y2. Here, due to the same reason as Example 2, the dynamo control device 6c additionally includes an integrator and two proportional gains K and J2 essential for the shaft inertia compensation control as illustrated in FIG. 25 other than two controllers Gc1 and Gc2 derived from the generalized plant Pg.

Figure 25:
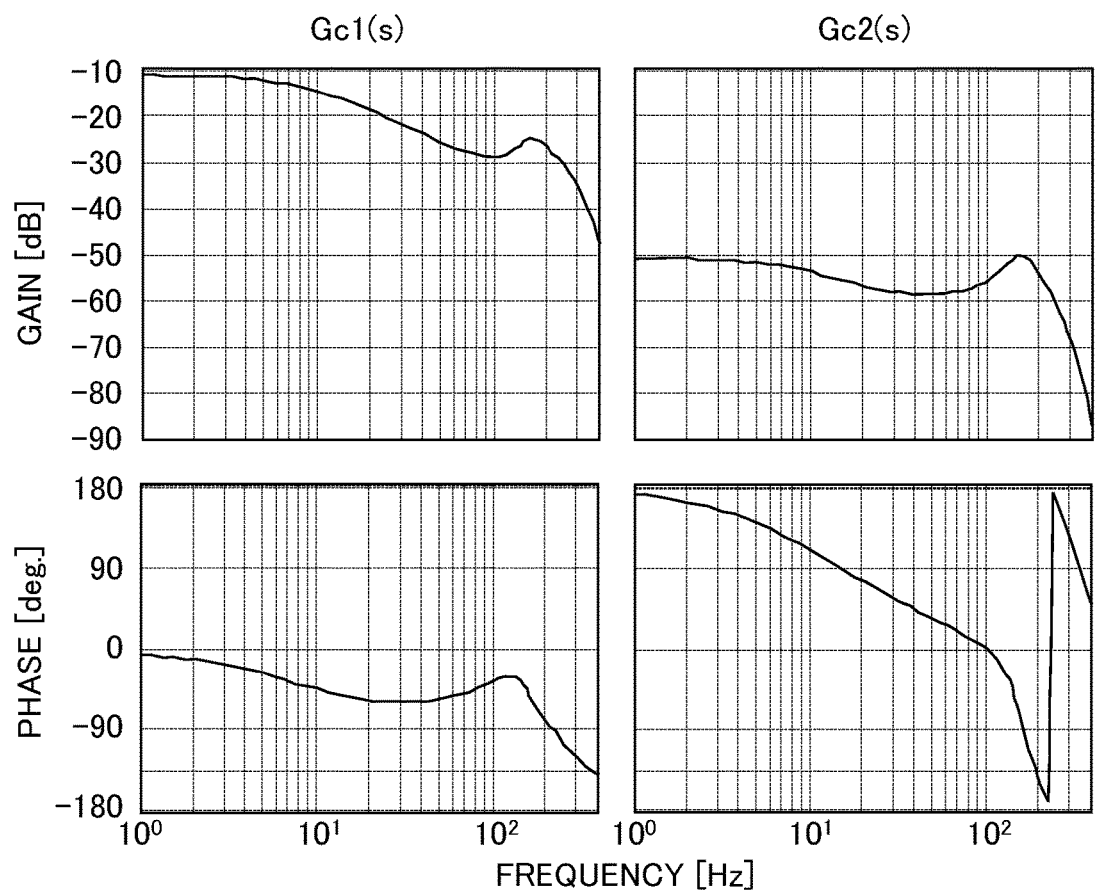
FIG. 25 is a bode diagram of controllers Gc1 and Gc2 of Example 7.
Figure 26:
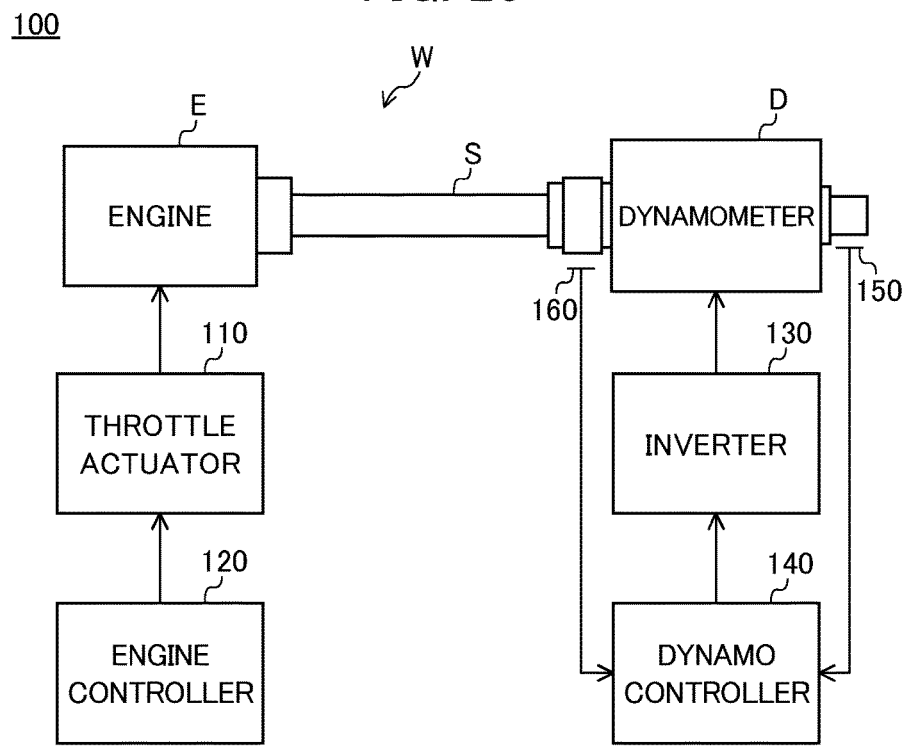
FIG. 26 is a diagram illustrating the configuration of a conventional dynamometer system.
Figure 27:
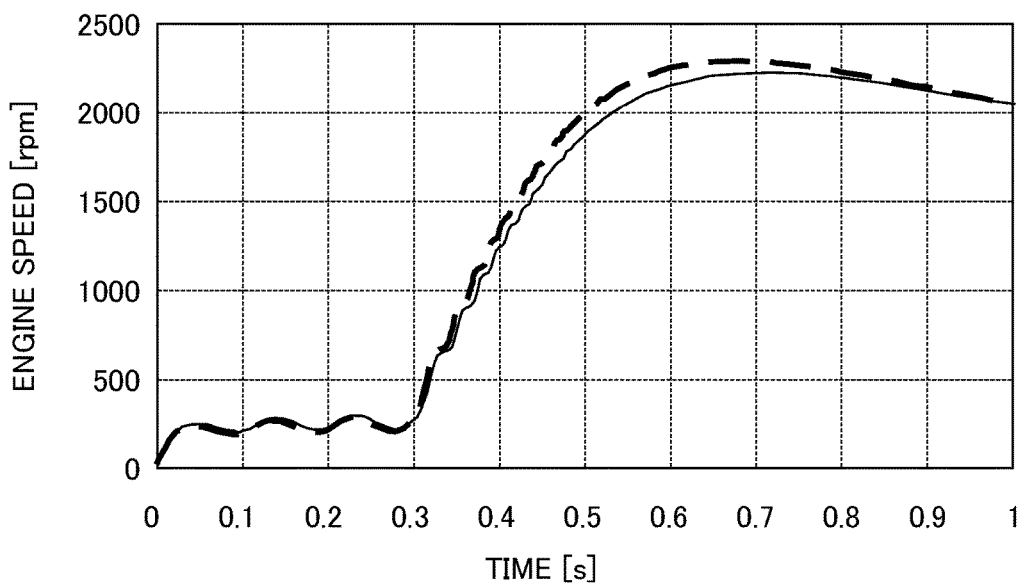
FIG. 27 is a diagram illustrating the change in rotation speed when an engine is started in a no-load state of the conventional dynamometer system.

FIG. 25 is a bode diagram of the controllers Gc1 and Gc2 of Example 7. In FIG. 25, the upper diagram indicates the gain characteristics and the lower diagram indicates the phase characteristics. According to this example, since the integrator or the proportional gain is included in the generalized plant Pg, the substantially same effect as Example 2 is obtained. Particularly, since the gain block K as the loop gain is separated from the controllers Gc1 and Gc2 (see FIG. 24), the loop gain can be easily changed within a certain range without performing the H ∞ control or the μ synthesis again.

EXPLANATION OF REFERENCE NUMERALS 1 dynamometer system
E engine (test piece)
S shaft (intermediate connection body)
D dynamometer
Pa, Pb, Pc, Pd, Pe, Pf, Pg generalized plant
3 inverter
6a, 6b, 6c, 6d, 6e, 6f, 6g dynamo control device
61 shaft torque sensor (torque detector)
62 encoder (rotation speed detector)
7 dynamic characteristic model
8 controlled variable calculation unit
P4 to P9 mechanical model
P10 torque detection model
P11 rotation speed detection model
P12 inverter model

The invention claimed is:

1. A dynamo control device for a dynamometer system, the dynamometer system including a dynamometer connected to a test piece generating torque in response to a command from an external control device through an intermediate connection body, a torque detector detecting torsional torque of the intermediate connection body, a rotation speed detector detecting a rotation speed of the dynamometer, and an inverter supplying electric power to the dynamometer, the dynamo control device for the dynamometer system generating a torque current command to the inverter based on detection signals of the torque detector and the rotation speed detector so as to realize a no-load state where a load is not applied to the test piece,
wherein the dynamo control device includes a controller designed by applying a control system design method called an H∞ control or a μ synthesis to a generalized plant,
wherein the generalized plant outputs a first observation output corresponding to the detection signal of the torque detector, a second observation output corresponding to the detection signal of the rotation speed detector and a prescribed controlled variable from an external input corresponding to torque generated in the test piece and a control input corresponding to the torque current command,
wherein the generalized plant includes a dynamic characteristic model identifying a characteristic of the dynamometer system so that angular acceleration of the test piece is output from the external input and the control input based on the equation of motion of a three-inertia system,
wherein the three-inertia system is configured by connecting the test piece, the intermediate connection body and the dynamometer each having an original inertia moment,
wherein the controlled variable of the generalized plant is a signal obtained by multiplying a weighting function having an integration characteristic by a difference between angular acceleration of the test piece in the state of being disconnected from the intermediate connection body and the dynamometer calculated by multiplying an inverse number of the inertia moment of the test piece by the external input and angular acceleration of the test piece calculated by the dynamic characteristic model, and
wherein the controller is designed by numerical calculation based on the control system design method so that responsiveness from the external input to the controlled variable in the generalized plant decreases.

2. The dynamo control device for the dynamometer system according to claim 1, wherein the dynamic characteristic model of the generalized plant includes an inverter model identifying a characteristic of the inverter, a mechanical model identifying a characteristic of the three-inertia system, a torque detection model identifying a characteristic of the torque detector, and a rotation speed detection model identifying a characteristic of the rotation speed detector.

3. The dynamo control device for the dynamometer system according to claim 2, wherein an output obtained by multiplying the control input by a prescribed proportional gain is set as an input of the inverter model,
wherein an output of an integrator provided in an output terminal of the torque detection model is set as a first observation output, and
wherein an output of a proportional gain provided in an output terminal of the rotation speed detection model is set as a second observation output.

4. The dynamo control device for the dynamometer system according to claim 2, wherein the control input is set as an input of the inverter model,
wherein an output obtained by multiplying a prescribed proportional gain by a difference between an output of the rotation speed detection model multiplied by a prescribed proportional gain and an output of an integrator provided in an output terminal of the torque detection model is set as a first observation output, and
wherein an output of the torque detection model is set as a second observation output.

5. The dynamo control device for the dynamometer system according to claim 2, wherein an output obtained by combining the control input with an output obtained by multiplying a prescribed proportional gain by a difference between an output of the rotation speed detection model multiplied by a prescribed proportional gain and an output of an integrator provided in an output terminal of the torque detection model is set as an input of the inverter model, and wherein an output of the torque detection model is set as an observation output.

6. The dynamo control device for the dynamometer system according to claim 2, wherein the control input is set as an input of the inverter model, and
wherein an output obtained by multiplying a prescribed proportional gain by a difference between an output of the rotation speed detection model multiplied by a prescribed proportional gain and an output of an integrator provided in an output terminal of the torque detection model is set as an observation output.

7. The dynamo control device for the dynamometer system according to claim 2, wherein the control input is set as an input of the inverter model,
wherein an output obtained by multiplying a prescribed proportional gain by a difference between an output of the rotation speed detection model multiplied by a prescribed proportional gain and an output of an integrator provided in an output terminal of the torque detection model is set as a first observation output, and
wherein an output of a high-pass filter provided in the output terminal of the torque detection model is set as a second observation output.

8. The dynamo control device for the dynamometer system according to claim 2, wherein an output obtained by multiplying a prescribed proportional gain by the control input is set as an input of the inverter model,
wherein an output of the torque detection model is set as a first observation output, and
wherein a difference between an output of the rotation speed detection model multiplied by a prescribed proportional gain and an output of the torque detection model is set as a second observation output.

* * * * *